(12) United States Patent
Cook et al.

(10) Patent No.: US 8,361,621 B2
(45) Date of Patent: Jan. 29, 2013

(54) ADDITIVES FOR THE USE OF MICROWAVE ENERGY TO SELECTIVELY HEAT THERMOPLASTIC POLYMER SYSTEMS

(75) Inventors: Michael Cook, Horgen (CH); Michael S. Paquette, Midland, MI (US); Robert P. Haley, Jr., Midland, MI (US); Sam Crabtree, Midland, MI (US); Jose Longoria, Lake Jackson, TX (US); Saeed Siavoshani, Rochester Hills, MI (US); Peter K. Mercure, Midland, MI (US); Shih-Yaw Lai, Pearland, TX (US); Ronald G. Van Daele, Belsele (BE)

(73) Assignee: Dow Global Technologies LLC, Wilmington, DE (US)

( * ) Notice: Subject to any disclaimer, the term of this patent is extended or adjusted under 35 U.S.C. 154(b) by 686 days.

(21) Appl. No.: 12/301,934

(22) PCT Filed: May 31, 2007

(86) PCT No.: PCT/US2007/012822
§ 371 (c)(1),
(2), (4) Date: Jan. 15, 2010

(87) PCT Pub. No.: WO2007/143019
PCT Pub. Date: Dec. 13, 2007

(65) Prior Publication Data
US 2011/0104496 A1   May 5, 2011

Related U.S. Application Data

(60) Provisional application No. 60/809,520, filed on May 31, 2006, provisional application No. 60/809,526, filed on May 31, 2006, provisional application No. 60/809,568, filed on May 31, 2006.

(51) Int. Cl.
*B32B 27/20* (2006.01)
*C08K 3/32* (2006.01)

(52) U.S. Cl. ........ 428/404; 428/407; 428/454; 428/446; 428/689; 977/773; 977/810; 977/788; 977/742; 264/490; 264/474; 264/413

(58) Field of Classification Search .................. 428/407, 428/404, 454, 446, 689; 977/773, 810, 788, 977/742; 264/490, 474, 413
See application file for complete search history.

(56) References Cited

U.S. PATENT DOCUMENTS

| 5,070,223 A | 12/1991 | Colasante |
| 5,234,730 A * | 8/1993 | Lautenschlaeger et al. .... 428/34 |
| 5,338,611 A * | 8/1994 | Lause et al. ................... 428/412 |
| 5,519,196 A | 5/1996 | Xu |
| 5,565,132 A | 10/1996 | Salyer |
| 2003/0069326 A1 | 4/2003 | Stangel et al. |
| 2005/0124244 A1 | 6/2005 | Lee |
| 2006/0157350 A1* | 7/2006 | Williamson et al. .......... 204/471 |

FOREIGN PATENT DOCUMENTS

| CN | 1532043 A | 9/2004 |
| JP | 02-129243 A | 5/1990 |
| JP | 02-182758 A | 7/1990 |
| JP | 09-067461 A | 3/1997 |
| JP | 09-143462 A | 6/1997 |
| KP | 1992-0001445 B1 | 2/1992 |
| KP | 2001-0106116 A | 11/2001 |
| WO | 0134702 A2 | 5/2001 |
| WO | 2004/048463 | 6/2004 |

OTHER PUBLICATIONS

Translation of Second Office Action issued in corresponding Chinese application No. 200780027612.8 (4 pages).
Translation of First Office Action issued in corresponding Chinese application No. 200780027612.8 (3 pages).
International Search Report from PCT/US2007/012822 dated Nov. 22, 2007 (2 pages).
First Office Action filed under Japanese Application No. 2009-513271 on Jan. 23, 2012 (4 pages).
Translation of Fourth Office Action in corresponding Chinese application No. 200780027612.8 (2 pages).

* cited by examiner

*Primary Examiner* — Robert D. Harlan
(74) *Attorney, Agent, or Firm* — Osha Liang LLP

(57) ABSTRACT

A microwave-sensitive thermoplastic composition that includes a microwave-receptive additive; and a thermoplastic polymer; wherein the microwave-receptive additive is selected from the group consisting of sepiolite clay, molecular sieves formed from ammonium ion salts or hydrogen ion salts, aluminophosphates, silicoaluminophasphates, silicotitanates, organo-modified clays, molecular sieves or zeolites having a caged organic microwave receptive material, and combinations thereof.

21 Claims, 15 Drawing Sheets

ADDITIVES FOR THE USE OF MICROWAVE ENERGY TO SELECTIVELY HEAT THERMOPLASTIC POLYMER SYSTEMS

CROSS-REFERENCE TO RELATED APPLICATION

This application claims priority to U.S. Provisional Application Ser. Nos. 60/809,520, 60/809,526, and 60/809,568, each filed on May 31, 2006 and each incorporated herein by reference.

BACKGROUND OF DISCLOSURE

1. Field of the Disclosure

Embodiments disclosed herein relate generally to the use of microwave energy to selectively heat thermoplastic polymer systems. The polymer systems may either be inherently responsive to microwave energy or modified by incorporating appropriate microwave responsive additives in the polymer or as components on the backbone of the polymer.

2. Background

Thermoplastic polymer pellets typically must be melted, re-shaped and cooled in a primary conversion process, such as extrusion or injection molding, in order to make parts of commercial value. In some instances, a secondary fabrication process, such as thermoforming, which involves further heating, reshaping, and cooling is required to achieve parts of commercial value. In both primary and secondary processes, heat energy is applied to the thermoplastic and is subsequently removed after reshaping has occurred.

Conventional heating mechanisms for thermoplastic polymer systems in many instances rely on contact or radiant heat sources. Radiant energy, commonly referred to as infrared, has a wavelength in the range of 1 to 10 microns and will penetrate absorbing materials to a depth of approximately 1 to 2 microns before half of the available energy has been dissipated as heat. The process of heat transfer continues through a process of conduction (in the case of a solid material) or a combination of conduction, convection and mechanical mixing in the case of a molten material. Contact heating similarly relies on conduction (or a combination of conduction, convection, and mixing) from the hot contact surface to heat the "bulk" of the material.

The rate of heat transfer (RHT) associated with a conductive heat transfer process can generally be described by the relationship: $RHT=f(A, C_t, \Delta T)$, where A is the area available for heat transfer, $C_t$ is the thermal diffusivity of the material, and $\Delta T$ is the available temperature driving force, which will decrease with time as the temperature of the material being heated increases. The thermal diffusivity, $C_t$, of unmodified thermoplastics is inherently low, thereby impeding the heat transfer in a conventional radiant or contact heating system. Furthermore, the heat conduction process may result in an undesirable temperature gradient with the surface of the part being heated (such as a sheet material) being substantially hotter than the center of the part being heated, and being highly dependent on the thickness distribution of the part being heated.

By way of contrast, microwaves have a wavelength of approximately 12.2 cm, large in comparison to the wavelength of infrared. Microwaves can penetrate to a much greater depth, typically several centimeters, into absorbing materials, as compared to infrared or radiant energy, before the available energy is dissipated as heat. In microwave-absorbing materials, the microwave energy is used to heat the material "volumetrically" as a consequence of the penetration of the microwaves through the material. However, if a material is not a good microwave absorber, it is essentially "transparent" to microwave energy.

Some potential problems associated with microwave heating include uneven heating and thermal runaway. Uneven heating, often due to the uneven distribution of microwave energy through the part, may be overcome to a certain extent, such as in a conventional domestic microwave oven, by utilizing a rotating platform to support the item being heated. Thermal runaway may be attributed to the combination of uneven heating outlined above and the changing dielectric loss factor as a function of temperature.

Microwave energy has been used, for example, to dry planar structures such as wet fabrics. Water is microwave sensitive and will evaporate if exposed to sufficient microwave energy for a sufficient period of time. However, the fabrics are typically transparent to microwaves, thereby resulting in the microwaves focusing on the water, which is essentially the only microwave-sensitive component in the material. Microwave energy has also been used to heat other materials, such as in the following references.

U.S. Pat. No. 5,519,196 discloses a polymer coating containing iron oxide, calcium carbonate, water, aluminum silicate, ethylene glycol, and mineral spirits, which is used as the inner layer in a food container. The coating layer can be heated by microwave energy, thereby causing the food in the container to brown or sear.

U.S. Pat. No. 5,070,223 discloses microwave sensitive materials and their use as a heat reservoir in toys. The microwave sensitive materials disclosed included ferrite and ferrite alloys, carbon, polyesters, aluminum, and metal salts. U.S. Pat. No. 5,338,611 discloses a strip of polymer containing carbon black used to bond thermoplastic substrates.

WO 2004048463A1 discloses polymeric compositions which can be rapidly heated under the influence of electromagnetic radiation, and related applications and processing methods.

A key limitation to the use of microwaves for heating polymeric materials is the low microwave receptivity of many useful polymers. The low microwave receptivity of the polymers thus requires either high powers or long irradiation times for heating such polymeric systems. In polymers designed specifically for microwave absorption, there is often a trade-off between their microwave properties and mechanical or thermal properties, i.e., the mechanical and thermal properties are often less than desirable.

Accordingly, there exists a need for processes and polymeric materials which facilitate the rapid, volumetric heating of the polymer using microwave energy. Additionally, there exists a need for processes and polymeric materials that have the ability to heat or melt only a portion of the polymeric material, sufficient to render the bulk material capable of flow, facilitating the shaping or further processing of the polymer.

SUMMARY OF DISCLOSURE

In one aspect, embodiments disclosed herein relate to a microwave-sensitive thermoplastic composition that includes a microwave-receptive additive, and a thermoplastic polymer, wherein the microwave-receptive additive is selected from the group consisting of sepiolite clay, molecular sieves formed from ammonium ion salts or hydrogen ion salts, aluminophosphates, silicoaluminophosphates, silicotitanates, organo-modified clays, molecular sieves or zeolites having a caged organic microwave receptive material, and combinations thereof.

Other aspects and advantages will be apparent from the following description and the appended claims.

DETAILED DESCRIPTION

Figure 1:
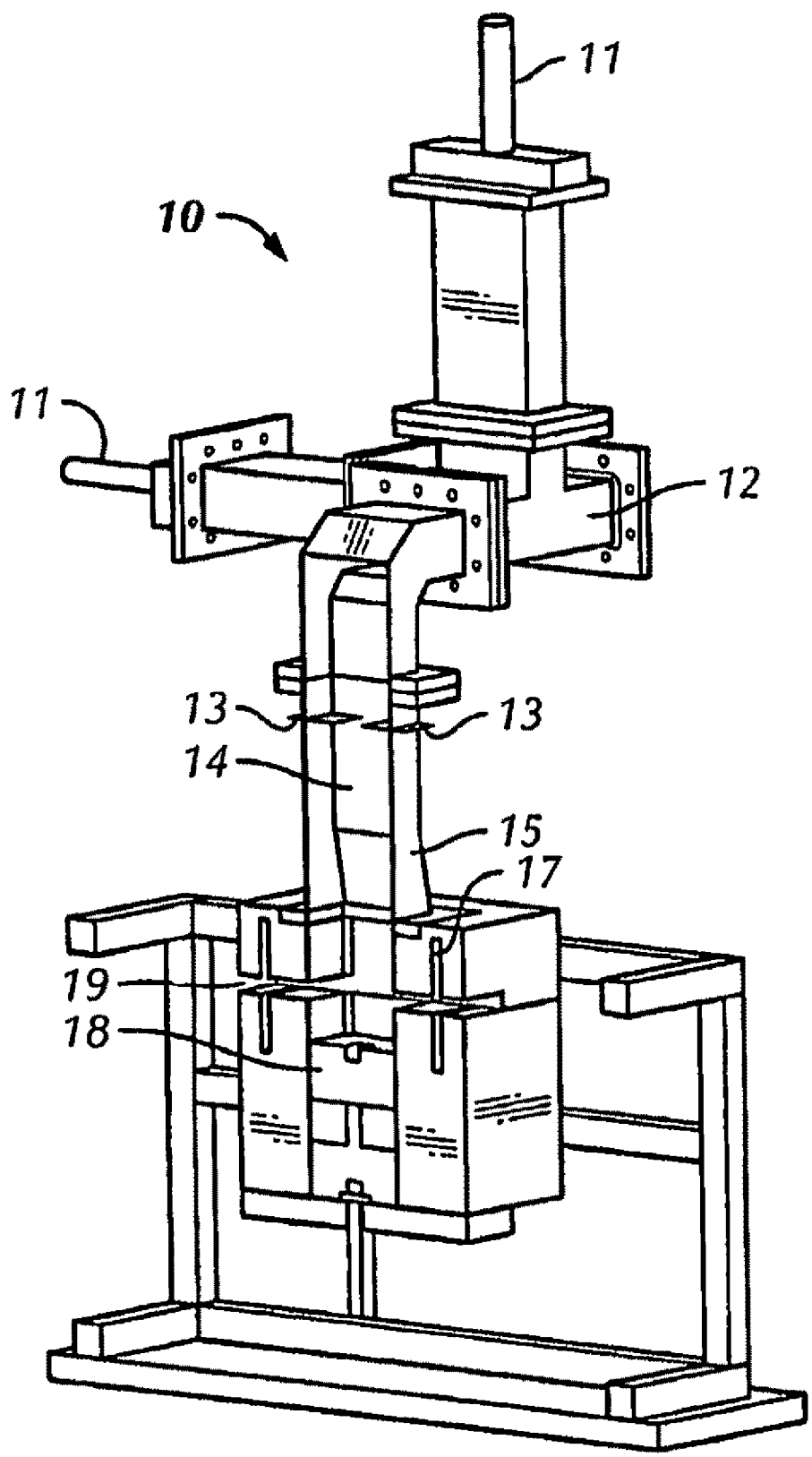
FIG. 1 illustrates a microwave heating device useful in embodiments described herein.

In one aspect, embodiments described herein relate to polymers incorporating microwave receptive components, either on the backbone of the polymer or as polymeric or non-polymeric additives in the polymer, which may allow the polymer to be heated rapidly and controllably through the application of microwave energy. In other aspects, embodiments described herein relate to methods for processing polymers incorporating microwave receptive components.

Compared to alternative methods of heating, such as radiant, convective, or contact heating, the use of microwave energy may result in very rapid, volumetric heating. The use of microwave energy may overcome two fundamental limitations of the conventional heating systems: the dependence on the thermal conductivity of the polymer to transport heat energy form the surface of the part; and the maximum allowable temperature of the polymer surface which in turn determines the maximum available temperature driving force.

A polymer may inherently be receptive to microwaves based upon its chemical composition. Alternatively, a microwave sensitive polymer composition may be formed by combining a microwave receptive additive with a base polymer which is non-receptive to microwaves. Suitable base polymers, microwave receptive polymers, and microwave receptive additives useful in embodiments of the present invention are described below. The resulting microwave receptive or microwave sensitive polymers may be heated using microwave energy, in lieu of or in combination with radiant, convective, or contact heating. The heated polymer may then be mixed, transferred, shaped, stamped, injected, formed, molded, extruded or otherwise further processed, such as in a primary conversion process or a secondary fabrication process to form useful articles.

Embodiments disclosed herein relate to the efficient conversion of thermoplastic materials using electromagnetic energy, by selectively heating a portion of the volume of the thermoplastic material, that portion being sufficient to render the material processable in a subsequent forming technique. As used herein, processable means the provision of sufficient melt-state or softening of at least a portion of the thermoplastic in order for the bulk plastic to be mixed, transferred, shaped, stamped, injected, extruded, etc., to form a product. The heating of the thermoplastic substrate may be achieved by the exposure of the thermoplastic to electromagnetic energy, such as microwaves, which have the ability to penetrate through the entire volume of the substrate and to be preferentially absorbed in microwave sensitive regions.

By applying microwave radiation, heat may be generated locally at a predetermined region of the volume, bulk, or part of the polymer specimen. Thus, the amount of energy applied may be carefully controlled and concentrated, as other regions may consist of non-absorbing materials which are transparent to the radiation used. For example, untreated polypropylene and polyethylene are transparent to microwave radiation. By focusing on materials that are receptive to microwaves, the energy used may be reduced, the cycle times shortened and the mechanical and other properties of the final material may be adapted and optimized for various requirements and applications.

Sites within the microwave sensitive material may be either favorable or non-favorable for absorption of the electromagnetic energy. Sites that are favorably absorptive will readily and rapidly heat under the influence of electromagnetic energy. In other words, only a specified portion of the volume of the substrate will be strongly affected by the electromagnetic energy, relative to other regions of the material.

In this manner, the electromagnetic energy interacts with only certain regions of the substrate, which will increase in temperature when electromagnetic energy is present. The heating of neighboring regions within the bulk material will subsequently occur due to thermal conduction and other such mechanisms. As the bulk material is heated volumetrically, the material may be converted into a processable state more rapidly as compared to conventional heating techniques. Moreover, because that material may contain less heat energy than would normally be present had the entire bulk material been heated via surface conduction (infrared heating), there may be considerable savings in energy. For example, infrared heating results in significant energy losses to the atmosphere, and requires that the surface temperature of the part is significantly higher than the desired bulk temperature in order to effect an acceptable rate of heat transfer from the part surface to the part core and raise the core temperature to that required for processing. In contrast, microwave selective heating, which causes the temperature of the microwave sensitive polymer to heat rapidly and volumetrically to processing temperature, may result in a significantly lower polymer surface temperature, especially in such cases that comprise microwave transparent surface layers. Microwave heating may also have less tendency for energy to be lost from the system, transferring energy primarily to where it is needed, i.e. the microwave sensitive polymer. Microwave heating may also result in considerable savings in cycle time for a conversion process. The heating time may be reduced, not only because the microwave heating mechanism occurs rapidly throughout the bulk (in contrast to thermal conduction), but the total energy content of the part is less. The cooling cycle may also be reduced as the unheated regions of material effectively act as heat sinks to draw heat out of the neighboring heated regions, significantly enhancing the overall cooling rate of the bulk material.

The microwave sensitive polymers described herein may be used during the primary conversion or secondary fabrication processes. For example, in some embodiments, the microwave sensitive polymer may be used during the fabrication of polymeric articles including films, foams, profiles, compounded pellets, fibers, woven and non-woven fabrics, molded parts, composites, laminates, or other articles made from one or more polymeric materials. In other embodiments, the microwave sensitive polymer may be used in conversion processes such as sheet extrusion, co-extrusion, foam extrusion, injection molding, foam molding, blow molding, injection stretch blow molding, and thermoforming, among others.

Microwave Receptive Additive

A number of materials may be heated by the absorption of microwaves. This may be achieved by a dipolar heating mechanism and involves the stimulated movement of permanent dipoles and/or charges, as they attempt to oscillate in sympathy with the oscillating electromagnetic wave moving through the material. The material is thus heated by agitation of molecules and the subsequent viscous transfer of heat to neighboring atoms and molecules. Other materials may heat through Ohmic (resistance) heating as the electric field of the electromagnetic wave stimulates current flow within the material. Yet other microwave heating mechanisms include Maxwell-Wagner and magnetic heating mechanisms. The degree to which any material will heat in the presence of a microwave field is defined by its dielectric loss factor (also referred to as loss tangent or complex dielectric permittivity), which is in effect a measure of the strength of interaction between the material and the electromagnetic wave. Crucially, this heating is a bulk effect, that is, the material effectively heats "volumetrically" and a desired temperature distribution may therefore be achieved in a part through appropriate part design. For example, in a coextruded sheet designed for thermoforming, a microwave sensitive core layer enables the sheet to be heated from the inside out resulting in a cooler, more desirable sheet surface temperature.

Microwave absorbing agents may also be used as an additive in a material to render the material heatable by electromagnetic radiation (usually microwave or radar). Other agents added to polymeric materials, to change or improve certain properties, may also impart improved heatability to the polymer. Such additives can be added to polymers to facilitate microwave heating of the polymers.

The microwave receptor, or the additive which may be blended with a base thermoplastic polymer to form a microwave sensitive polymer, may include conductive or magnetic materials such as metals, metal salts, metal oxides, zeolites, carbon, hydrated minerals, hydrated salts of metal compounds, polymeric receptive materials, clays, organo-modified clays, silicates, ceramics, sulfides, titanates, carbides, and sulfur, among others. Microwave receptive additives may include:

a) elements, such as C, Co, Ni, Fe, Zn, Al, Cu, Ag, Au, Cr, Mo, and W;
b) heavy metal salts, such as $CuX_n$, $ZnX_2$, or $SnX_2$, where X is a halogen, and n is an integer from 1 to 6;
c) salt hydrates, such as $NiCl_2 \cdot 6H_2O$, $Al_2(SO_4)_3 \cdot 18\ H_2O$;
d) complex hydrates, such as ettringite;
e) other simple hydrates, such as Epsom salts;
f) metal oxides, such as CuO, $Cu_2O$, NiO, $Fe_3O_4$, $Fe_2O_3$, FeO $Co_2O_3$;
g) complex oxides, such as $BaTiO_3$;
h) metal sulfides, such as $Ag_2S$, CuS, $MoS_2$, PbS, ZnS, FeS iron pyrite ($FeS_2$), and other pyrites;
i) metal carbides and nitrides, such as $W_2C$, SiC, $B_4C$, and TiN;
j) semiconductors such as Si, Ge, Se, GaP, GaAs, InP, InAs, CdS, CdSe, and ZnSe;
k) ion conductors, such as solid acids, beta alumina, polymer acids, and ion exchangers;
l) water-containing materials, such as hydrated forms of zeolites, silicas, aluminas, aluminophosphates, aluminosilicates, magnesia, titania, clays, micas, gels, vermiculites, attapulgites, sepiolites, other inorganic gels, organic hydrogels such as superabsorbant polymers (SAP), Methocel, and hydroxyethylcellulose (HEC), carboxymethylcellulose, and microencapsulated water;
m) molecular, oligomeric, or polymeric material with permanent dipoles, such as molecules, oligomers, or polymeric materials having functionalities which may include mono- or poly-substitution with hydroxyls, amines, amides, carbonyls, esters, carbonates, carbamates, ureas, thioureas, nitriles, nitros, nitrates, nitrosyls, hydroxylamines, ammoniums, sulfonamides, sulfhydryls, sulfides, sulfones, sulfoxides, phosphates, phosphonates, phosphonamides, halides, oxyhalides, and may also include sugars, amino acids, lactams, ethylene carbon monoxide (ECO) copolymers, polyamides, polyesters, polyacrylates, acrylate copolymers, acrylate-modified polymers, starches, keratin, gelatin, other bioproducts, formamide, n-methyl formamide, n-methylacetamide, and combinations thereof;

n) caged dipoles, such as the dipoles listed in (m) above absorbed in zeolites or clays or on silica gel or other inorganic or organic sorbants, or encapsulated;

o) organic conductors, other than metals and semiconductors, such as polyaniline, polypyrrole, polyacetylene, and other organic conductors;

p) magnetics, such as hard or soft ferrites, Sr or Ba titanates, CoZn, NiZn, or MnZn.

In some embodiments, the microwave receptive additive may include, for example, copper, aluminum, zinc oxide, germanium oxide, iron oxide or ferrites, alloys of manganese, aluminum and copper, manganese oxide, oxides of cobalt or aluminum, SiC, $Na_2TiO_3$, $Al_2O_3$, $MnO_2$, $TIO_2$, and $Mg_2TiO_4$. In other embodiments, microwave receptive carbon may include, for example, graphite, carbon black, graphene, and carbon nanotubes. In particular embodiments, the microwave receptive additive may include aluminum silicates, iron ferrites such as $Fe_3O_4$, zeolites such as Zeolite A, carbon, or combinations thereof.

In addition to the above microwave receptive additives, it has been discovered that certain other crystalline additives may be effective as microwave receptors, and may include ionic conductors such as inorganic solid acids or salts, polymer acids or salts, or inorganic or polymeric ion-exchangers. In one particular embodiment, an ion-exchanging additive is the synthetic Zeolite 4A.

Other compounds that may be effective as microwave receptors include water containing materials where the additive contains an amount of water which enhances the receptivity. This hydrated additive may be based on inorganic, molecular, or polymeric substances. For example, a hydrated inorganic additive may be a hydrated Zeolite 13X, where the zeolite is capable of absorbing up to 30% of its weight as water.

Other compounds that may be effective as microwave receptors include inorganic or polymeric substances which contain a molecular or polymer microwave receptor. The receptor species may lay within the inorganic or polymeric substance, may be present as a coating on particles of the inorganic or polymeric substance, or may be a guest within pores of the inorganic or polymeric substance. For example, ethylene glycol may be adsorbed in the 3-dimensional cages of zeolite NaY.

Sepiolite clay may also be used as a microwave receptive additive. Sepiolite is a natural clay mineral that contains strongly held water. The strongly held water may allow for microwave receptivity of the clay, and may also provide for heating with essentially no bubble formation or minimal bubble formation due to the presence of the water during heating.

Molecular sieves or zeolites formed from an ammonium ion salt or a hydrogen ion salt may also be used as a microwave receptive additive. For example, an ammonium form of molecular sieve Y may be used.

Zeolite-like synthetic materials may also be used as a microwave receptive additive. For example, synthetic materials such as aluminophosphates, silicoaluminophosphates, and silicotitanates, and other admixtures of light metals having structures and hydration behavior similar to that of zeolitic materials, may be used.

In other embodiments, molecular sieves described above, including zeolites formed from alkali metal salts, alkaline earth metal salts, ammonium ion salts, and hydrogen ion salts, may include an adsorbed organic material in the zeolite cages. For example, ethylene glycol and other microwave receptive organic materials may be adsorbed in the zeolite or molecular sieve, providing enhanced microwave receptivity to the molecular sieve.

Still other compounds that may be effective as microwave receptors include materials which may impart receptivity and selective heating to the desired portion of the part. These may include organic conductors such as polyaniline.

In addition to the above additives, microwave receptive polymeric materials may be used as the major component of a microwave sensitive layer, or may be a minor component blended with other low- or non-microwave receptive polymers to form a microwave sensitive layer. Polymeric receptive materials may include ethylenevinylalcohol polymers, polyketones, polyurethanes, polyamides, polyvinylchloride, polyacrylates, ethylene carbon monoxide copolymers, polyaniline, and others, for example. Microwave receptive polymers may be formed where certain groups are incorporated into the polymer structure, such as CO, OH, NH, methacrylates, carbon dioxide, acrylic acids, vinyl acetate, alcohols, and vinyl or polyvinyl alcohols, for example. Such microwave receptive moieties may be incorporated into the backbone of the polymer chain or may be appended to the polymer chain.

As described above, microwave-receptive additives may contain tightly bound water, such as zeolites and clays. These materials may also include adsorbed water which may be released from the additive upon heating. In some embodiments, microwave-receptive additives may be dried before combination with the polymer. In some embodiments, microwave-receptive additives may be combined with a polymer and the water removed, such as through use of a vented extrusion system. In other embodiments, parts or sheets of polymer containing microwave-receptive additives with bound water may be dried prior to processing of the sheet in a microwave apparatus. In this manner, undesired bubble formation due to excess water may be minimized or avoided.

In some embodiments, the microwave receptive additive may be in the form of powders, flakes, spheres, pellets, granules, liquids, or gels. The preferred form of the microwave receptive additive may depend on the stage at which the additive is blended, such as during the polymerization process, during purification or pelletizing of the polymer, or during a compounding process. In other embodiments, the additive may be compounded immediately prior to or during a primary conversion or secondary fabrication process, such as during extrusion, injection molding, or other processes using polymers. In some embodiments, the blending of a microwave receptive additive may impart improved microwave receptivity without significant effect on the properties of the polymer matrix.

Any of the above additives may be used separately or in combination to provide the desired effect of selective heating. For example, a synergistic effect may be realized where various zeolites are combined, giving much higher receptivity than one form of zeolite alone, and where only a solid (i.e. hydrated zeolite) is added to the formulation. The additive, such as in this example, may remain as a solid powder, which may be compounded into the polymer without difficulty. The size of the microwave receptive additive used may depend upon the size of the polymer matrix in which the additive is to be dispersed; thicker matrices may accommodate larger particles. In some embodiments, the average particle size of the microwave receptive additive may range from 0.1 nm to 50 microns; from 0.1 nm to 1 micron in some embodiments; from 0.1 microns to 25 microns in other embodiments; from 1 to 15 microns in other embodiments; and from 5 microns to 10 microns in yet other embodiments. Particles sizes used may include monodisperse particles (having a narrow size range), or polydispers particles (having a broad size range)

In some embodiments, microwave receptive additives may exhibit a narrow band response to electromagnetic energy. In other embodiments, the microwave receptive additive may be heated by irradiation across a broad band of frequencies. In one embodiment, the additive may be regarded as having a receptive nature over a frequency range from 1 MHz to 300 GHz or above. In other embodiments, the additive may be heated in a frequency range from 0.1 to 30 GHz or above; from 400 MHz to 3 GHz in other embodiments; and from 1 MHz to 13 GHz or above in other embodiments. In yet other embodiments, the additive may be heated in a frequency range from 1 to 5 GHz.

In some embodiments, a microwave sensitive polymer may be formed by dry blending a base polymer and a microwave receptive additive. In other embodiments, a microwave sensitive polymer may be formed by compounding or by coating the additive with the polymeric material. In yet other embodiments, a microwave sensitive polymer may be formed by blending a microwave receptive additive with a wet polymer dispersion and subsequently drying off the water from the dispersion.

Polymer

Polymers which may be combined with one or more microwave receptive additives to form a more microwave sensitive polymer include resins selected from polyolefins, polyamides, polycarbonates, polyesters, polylactic acid and polylactide polymers, polysulfones, polylactones, polyacetals, acrylonitrile-butadiene-styrene resins (ABS), polyphenyleneoxide (PPO), polyphenylene sulfide (PPS), styrene-acrylonitrile resins (SAN), polyimides, styrene maleic anhydride (SMA), aromatic polyketones (PEEK, PEK, and PEKK), ethylene vinyl alcohol copolymer, and copolymers or mixtures thereof. In certain embodiments, polyolefins and other polymers which may be combined with a microwave receptive additive include polyethylene, polypropylene, polystyrene, ethylene copolymers, propylene copolymers, styrene copolymers, and mixtures thereof. In other embodiments, polymers which may be combined with a microwave receptor include acrylonitrile-based polymers, hydroxyl group-containing polymers, acryl- or acrylate-based polymers, maleic anhydride-containing or maleic anhydride-modified polymers, acetate-based polymers, polyether-based polymers, polyketone-based polymers, polyamide-based polymers, and polyurethane-based polymers.

In some embodiments, the microwave sensitive polymer may be incorporated as a discrete layer (or several layers) in a multi-layered structure in such a way that the discrete layer (or layers) may be preferentially heated prior to subsequent fabrication. Heat energy may then be conducted from these layers to adjacent layers of polymer that may be essentially "transparent" to microwave energy, thereby allowing the total polymer structure to reach the required fabrication temperature more rapidly than with a conventional heating system.

In certain embodiments, the microwave sensitive polymer may be formed by combining from 0.1 to 200 parts by weight microwave receptive additive per hundred parts polymer. In other embodiments, the microwave sensitive polymer may be formed by combining from 1 to 100 parts by weight microwave receptive additive per hundred parts polymer; from 2 to 50 parts in yet other embodiments; and from 3 to 30 parts in yet other embodiments.

In certain embodiments, the content of the microwave receptive additive may comprise from 0.1 to 25 weight percent of the microwave sensitive polymer. In other embodiments, the content of the microwave receptive additive may comprise from 1 to 20 weight percent of the microwave sensitive polymer; and from 2 to 15 weight percent in yet other embodiments.

In some embodiments, the microwave sensitive polymer may be in the form of powder, granules, pellets, uneven chippings, liquid, sheets, or gel. The microwave sensitive polymer may be crystalline, semi-crystalline, or amorphous. In some embodiments, the microwave sensitive polymer may include colorants, reinforcing or extending fillers, and other functional additives such as flame retardants or nanocomposites.

Microwave Heating Apparatus

Microwave sensitive polymeric materials described above may be heated using a microwave heating apparatus for further processing. Referring now to FIG. 1, a microwave heating apparatus 10 that may be used in accordance with embodiments of the microwave sensitive polymers disclosed herein is illustrated. Components of microwave heating apparatus 10 include tuning pistons 11, EH tuner 12, matching iris plates 13, waveguide 14, horn 15, microwave choke 17 and lower moveable piston 18. Polymer sheets may be processed through the microwave heating apparatus 10 by feeding the samples through the sample feed slot 19.

In some embodiments, microwave heating apparatus 10 may be capable of rapid and uniform heating of polymers, and may adapt to the nature of the microwave sensitive polymer (receptor type, receptor concentration, matrix type, etc.) and the form of the material being processed (thickness, shape, etc.). As used herein, rapid heating may refer to the heating of at least a portion of the sheet or part at a rate of at least 5° C. per second in some embodiments; at least 10° C. per second in other embodiments; at least 20° C. per second in other embodiments; at least 30° C. in other embodiments; and at least 50° C. in yet other embodiments. As used herein, uniform heating may refer to the heating of a sheet, or at least a selected portion of a sheet, wherein the heated portion has a maximum temperature variance of 10° C. or less in some embodiments; 7.5° C. or less in other embodiments; 5° C. or less in other embodiments; 4° C. or less in other embodiments; and 3° C. or less in yet other embodiments. By comparison to conventional infrared heating, the heating rates and temperature variances afforded by various embodiments of the microwave heating apparatuses disclosed herein may provide an advantage in cycle times, may minimize the deleterious effects on the polymer due to excess heat exposure, as well as provide improved processing.

Apparatus 10 may include a variable power source (not shown); horn 15 may provide a uniform energy density spread; and iris plates 13 and EH tuner 12 may allow for fine tuning of the wavelength emitted. In this manner, the microwave emitter may be tailored to efficiently heat a particular polymer. Analytical measurement devices (not shown) may also be provided to monitor the temperature of the polymer sheet being processed, among other variables. Although described with respect to heating sheet, other microwave heating apparatuses and processes may also be used with the microwave sensitive polymers described herein.

The power rating for the microwave emitter employed may depend on the composition, size or thickness of the polymer specimen being heated, and the desired temperature. The power rating may also be selected based on variables such as the cycle time for operations occurring upstream or downstream from the heating stage. In certain embodiments, a variable power source may be employed, providing process flexibility, such as the ability to vary a part size or composition (amount or type of microwave receptive additive).

Applications

As described above, the microwave sensitive polymers disclosed herein may be heated for subsequent processing, such as being mixed, transferred, shaped, stamped, injected, formed, molded, extruded, or otherwise further processed. In some embodiments, the microwave sensitive polymers may be useful in thick sheet thermoforming processes, such as for forming refrigerator liners, for example. In other embodiments, microwave sensitive polymers disclosed herein may be useful for the processing of air laid binder fibers, for example. In other embodiments, microwave sensitive polymers disclosed herein may be useful in blow molding processes, such as for the formation of blown bottles, for example. In other embodiments, microwave-sensitive polymers disclosed herein may be useful in foams, extruded foams, and other structures containing foam or a foam layer.

In other embodiments, microwave sensitive polymers disclosed herein may be useful in applications where the polymer being processed is not completely molten. For example, microwave sensitive polymers may be selectively heated, heating a only select portion of the polymer passing through the apparatus, thereby concentrating the heat energy to only that portion being further processed, such as by a forming, molding, or stamping process. This may enhance the structural integrity of the material handled during processing, may reduce cycle times, and may reduce the energy required for processing the material into the desired shape.

In other embodiments, microwave sensitive polymers disclosed herein may be useful in embossed sheets. In conventional infrared thermoforming, heat input must pass through the surface of the sheet, and often reduces the retention of the embossing structure or surface details. In addition to the reduced heating cycles, as described above, microwave sensitive polymers may allow for increased retention of embossing structures during processing due to the reduced energy footprint imparted to the sheet.

In other embodiments, selective heating may allow the use of microwave sensitive layers of polymer interspersed with non-sensitive layers. Layered polymers may provide for: optimum temperature profiling; the use of pulsed microwave energy during processing of the polymer; the selective placement of the microwave emitters providing for heating of specific regions of a part; and other manifestations which may provide for preferential or selective heating by virtue of the microwave sensitivity of one or more thermoplastic parts or layers.

Figure 2:
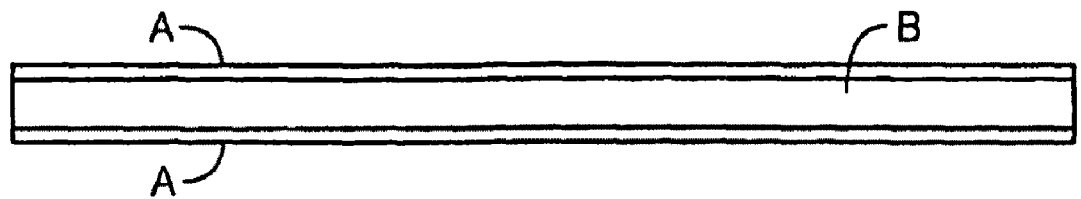
FIG. 2 illustrates one embodiment of a multilayered sheet incorporating a microwave sensitive layer.

As one example of sheet extrusion, a microwave sensitive layer may be incorporated into a multilayered sheet. For example, FIG. 2 illustrates one embodiment of a multilayered sheet incorporating a microwave sensitive layer. The microwave sensitive layer B may form a sheet core, bounded by outer layers A not sensitive to microwave heating. Incorporation of a microwave sensitive core layer may facilitate subsequent processing of the sheet, such as during sheet thermoforming. In some embodiments, sheet thermoforming may be facilitated by use of a microwave selective polymer by enabling thick sheet thermoforming, selective drawability, and rapid, uniform heating of the sheet.

Layered sheets as disclosed herein may include 2 or more layers, where one or more layers may include or be formed from microwave-sensitive polymer compositions. For example, layered sheets may include 3, 4, 5, 6, . . . , up to 1000 layers or more. In some embodiments, individual layers may have an average thickness of 0.1 microns to 25 mm, and the total thickness of the sheet may range from 100 microns to 25 mm. In some embodiments, sheets may include microlayered sheets, having multiple micron-thick layers.

Although illustrated in FIG. 2 as a three layered sheet, in other embodiments a microwave sensitive polymer may form a region or regions within a polymer structure. For example, the microwave sensitive polymer may form a discrete layer in a sheet having two or more layers. In other embodiments, the microwave sensitive polymer may form specific regions of a larger structure, allowing selective heating of those regions for further processing. In yet other embodiments, the microwave sensitive polymer may form one side of a side-by-side fiber structure. In yet other embodiments, the microwave sensitive polymer may form the core or the sheath of a core/sheath fiber structure.

In a foam extrusion process, for example, incorporation of a microwave sensitive layer may allow selective heating of the foam core and the solid, non-sensitive skin, enabling shorter heating cycles while preventing collapse of the foam structure. In other embodiments, incorporation of different concentrations of the microwave absorbing species in each of the layers may allow differential heating of each of the layers and hence optimization of any subsequent fabrication step, such as thermoforming. In other embodiments, incorporation of a microwave sensitive layer may allow selective foaming of a post-formed sheet.

In other embodiments such as injection molding or injection stretch blow molding, incorporation of a microwave sensitive layer may allow shorter cycles due to the internal cooling of the polymer, where the non-sensitive portions of the part act as heat sinks and therefore provide a reduced cooling time. Injection molding may also be facilitated by use of pulsed microwave energy, resulting in a mixture of molten and semi-molten material which can be injection molded, the semi-molten material acting as a heat sink during subsequent cooling of the part. Injection stretch blow molding may also benefit from the optimized thermal gradient resulting from microwave selective heating, allowing for improved mechanical properties of the final product.

Figure 3:
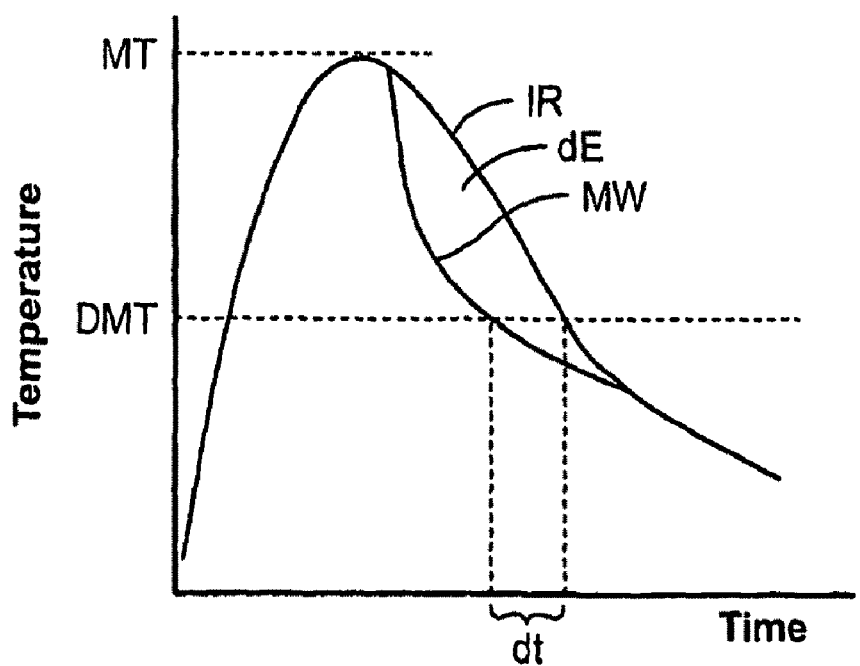
FIG. 3 is a graphical comparison of an infrared heating/cooling curve with a microwave heating/cooling curve, illustrating cooling cycle time reductions and the potential decreased energy resulting from the concept of a "heat sink" in the polymer system resulting from the use of pulsed microwave heating or other means of providing relatively hotter and cooler regions in the part.

FIG. 3 illustrates the decrease in cooling that may be obtained according to one embodiment of the present invention as compared to a conventional heating cycle. In addition to rapidly heating a polymer, which may decrease the heating cycle and energy requirements, sheets, pellets, or fibers having a microwave sensitive core may also be similarly heated to potentially result in a decreased cooling cycle. Comparing normal heating/cooling curve "IR," as shown in FIG. 3, with microwave heating/cooling curve "MW," the core polymer may be heated, conducting energy out to the outer, non-sensitive layers. When heated sufficiently, to molding temp "MT," the part may be formed, injected, etc. Due to the continuing conduction from the warmer core to the non-sensitive polymer, the part may cool to the de-molding temperature "DMT" faster than a part would cool following conventional heating, resulting in cycle time reduction "dt." The area dE between curves IR and MW represents the reduced thermal load that may be obtained by microwave heating a polymer having a microwave sensitive core.

In some embodiments, a layered thermoplastic sheet, containing microwave sensitive and non-microwave sensitive layers, may be selectively heated prior to thermoforming. In other embodiments, layered or co-extruded pellets of thermoplastic materials may be selectively heated prior to subsequent processing in for example, an injection molding process. These may result in accelerated cooling due to the presence of "internal heat sinks" described above, and hence reduced cycle time, similar to the layered sheet case described above.

In other embodiments, pulsed microwave energy may be used to create "slices," or discrete regions, of molten polymer interspersed with layers of un-melted polymer prior to subsequent processing. This may also result in accelerated cooling and hence reduced cycle time, similar to the layered sheet case described above.

In other embodiments, selective placement of one or more microwave emitters may allow selective heating of specific areas of a sheet or other thermoplastic part prior to subsequent processing. This may be particularly useful in thermoforming processes where the sheet must be deep drawn in a particular area.

In other embodiments, a process may employ selective heating and consolidation of an absorbent core, such as that used in hygiene products which contain a bicomponent binder fiber containing a microwave sensitive component (in particular polypropylene fibers or fibers containing a microwave sensitive material such as a maleic-anhydride graft or other polar species) and cellulosic fibers. For example, in a fiber-forming process, the planar material may pass through a microwave heater with energy sufficient to partially melt the polymeric fibers and heat the cellulosic fibers, by virtue of their inherent moisture content. Subsequently the fibers may be consolidated into an absorbent core with in integrated network of polymeric fibers and cellulose. Alternatively, the construction may be a technical textile where the microwave sensitive fiber may be used to bind together the woven or non-woven structure as a covered yarn.

In other embodiments, processes may employ a blend of two polymers, one being receptive to microwave energy, the other being transparent, in such a way that the microwave receptive domains can be selectively heated. The relative proportion of each of the polymers, the phase morphology, the concentration of the microwave sensitive component and the power applied may be used to control the rate of heating of the microwave sensitive phase and hence the rate of heating of the total composite.

In other embodiments, selective heating may allow the use of a microwave receptive reinforcing member within a transparent polymer matrix. The reinforcing member may take the form of a continuous mesh or net, a woven or non-woven fabric, continuous filaments or discontinuous, staple fibers. The reinforcing member may also be polymeric in nature or may comprise other non-polymeric, microwave-sensitive materials, such as carbon or metals.

In other embodiments, microwave receptive polymers may be used in the skin and/or core of a three (or more) layered foam structure (for example, a sheet), comprising solid skins and a foam core. The concentration of the microwave receptive components may be varied in each of the layers and the microwave power selected in order to achieve both rapid heating of each of the layers and the desired temperature distribution through the whole structure immediately prior to subsequent processing. This may eliminate the need for the very gradual heating required in infrared heating processes to achieve the desired thermoforming temperature profile without premature foam collapse.

In some embodiments, microwave receptive components in the form of zeolites, inorganic hydrates, or polymer hydrates in a thermoplastic polymer matrix (for example, a thermoplastic sheet) may be used. The zeolites may contain water within the zeolitic structure, may be heated using microwave energy, and the thermoplastic matrix subsequently re-shaped. For example, in the case of a sheet, the sheet may be formed into a container. The container may be further exposed to water to incorporate the latter into the pores of the zeolite within the formed container. The shaped container may subsequently be reheated, releasing the water from the hydrated additive as steam, which may act as a blowing agent causing the thermoplastic matrix to expand into foam.

In other embodiments, the use of microwave receptive materials on the skin layer of a packaging sheet used in the aseptic packaging processing of food products to selectively heat the skin layer may eliminate the need for hydrogen peroxide or steam sterilization.

EXAMPLES

In some embodiments, the microwave sensitive polymer may be incorporated as a discrete layer (or several layers) in a multi-layered structure in such a way that the microwave sensitive layers) may be preferentially heated prior to subsequent fabrication or processing. Heat energy will then be conducted from these layers to the adjacent polymer layers which are essentially "transparent" to microwave energy, thereby allowing the total polymer structure to reach the required fabrication temperature more rapidly than with a conventional heating system. In some embodiments, the A/B/A structure may be useful in thermoforming semi-crystalline materials such as polyolefins or polyamides.

The following examples include modeling predictions and experimental results for multilayered structures, and examples of cycle times for pulsed microwave energy during injection molding.

Example 1

Modeling of the Microwave Selective Heating Process

Referring to FIGS. 7-10, results from modeling the microwave heating and the radiant heating of a three layer A/B/A sheet system similar to that illustrated in FIG. 2, where the A layers may be essentially transparent to microwave energy, and the B layer may be sensitive to microwave energy, are shown. The multilayer A/B/A structure may be heated by microwave energy such that the B layer is heated preferentially. The heat energy may then be conducted to the A layers.

For example, the microwave heating device described above in relation to FIG. 1 may be used to heat a polymer sheet. Heating the A/B/A structure in this or a similar manner may be useful in thermoforming, as it results in a "reversed" temperature profile through the cross section of the sheet as compared to conventional radiant or contact heating. The reversed temperature profile may be better illustrated by comparing FIGS. 7 and 8 with FIGS. 9 and 10, where the A layers are cooler than the B layer for microwave heating, and the outer top layer is the warmest with radiant heating.

Figure 4:
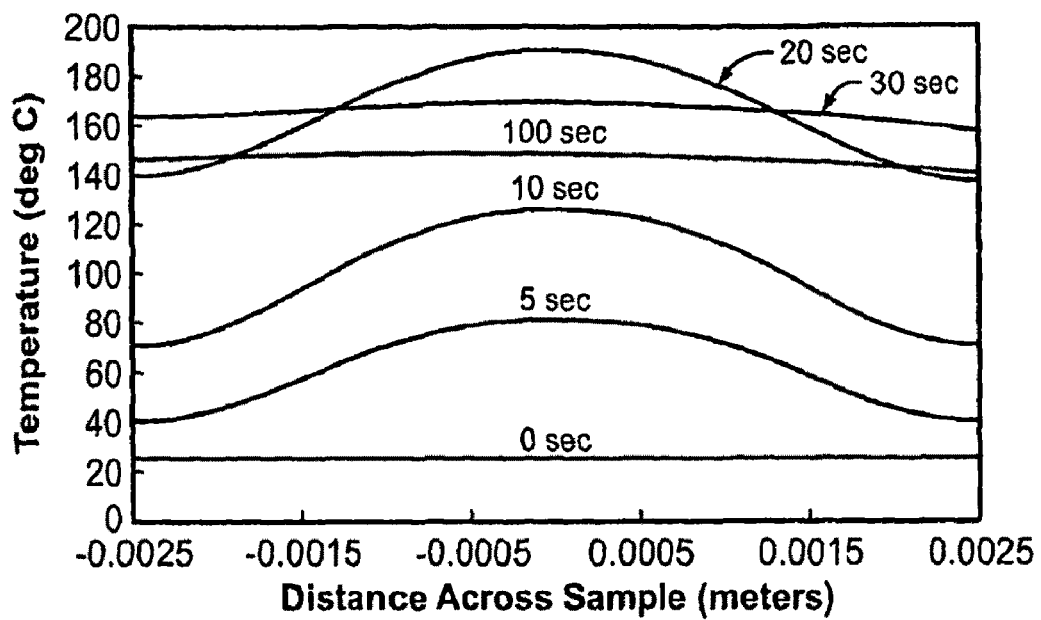
FIGS. 4 and 5 present modeling results for the thermal response of a three layer sheet system in a microwave heating system.
Figure 5:
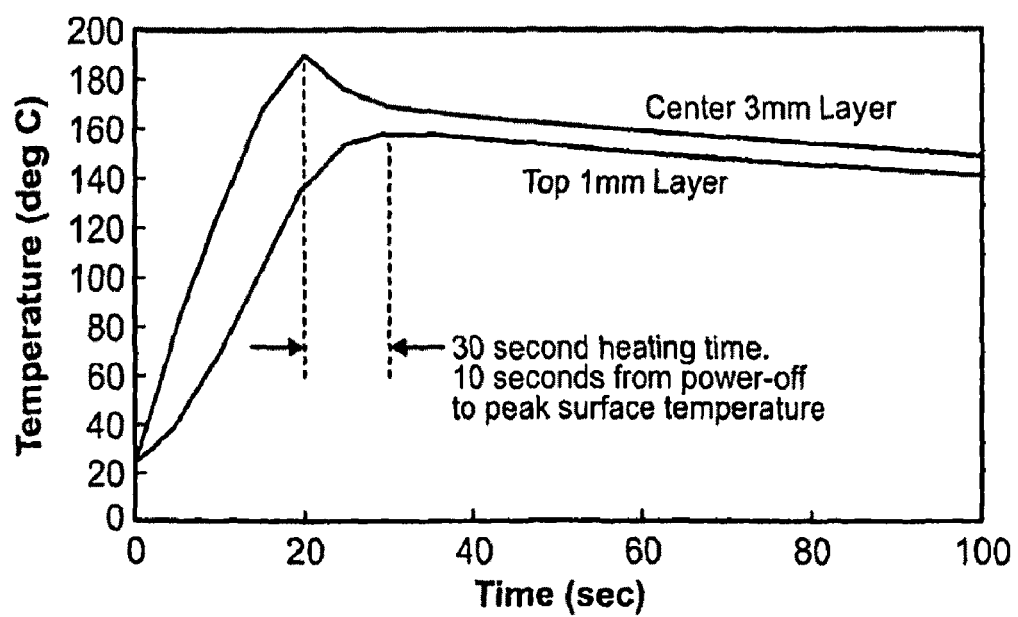

As illustrated in FIGS. 4 and 5, microwave heating results in heating the middle, microwave sensitive layer, as illustrated in FIGS. 4 and 5. The heat is then conducted to the outer layers. For this simulation, the sheet was exposed to microwave energy for 20 seconds to bring the core temperature up to 160° C. The top layer reaches a peak temperature 10 seconds after the microwave power is turned off. Conduction brings the entire sheet to approximately 160° C. after approximately 30 seconds total elapsed time, with a temperature differential of less than about 20 degrees across the thickness of the multilayer sheet.

Figure 6:
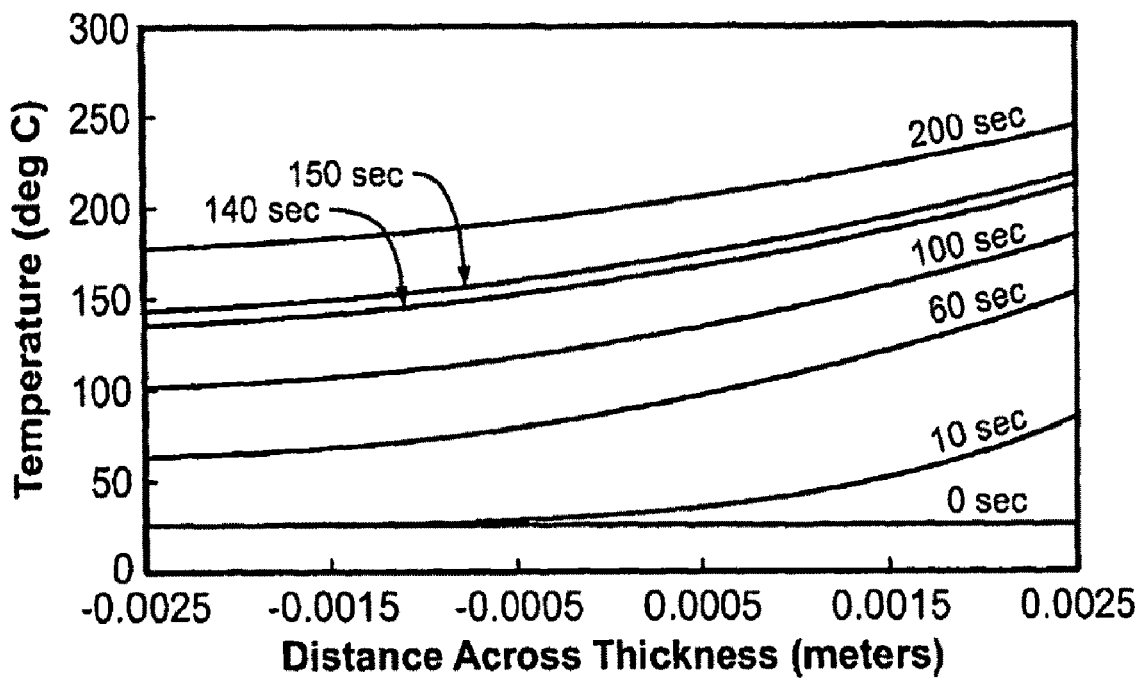
FIGS. 6 and 7 present modeling results for the thermal response of a three layered sheet system in a conventional radiant heating system.
Figure 7:
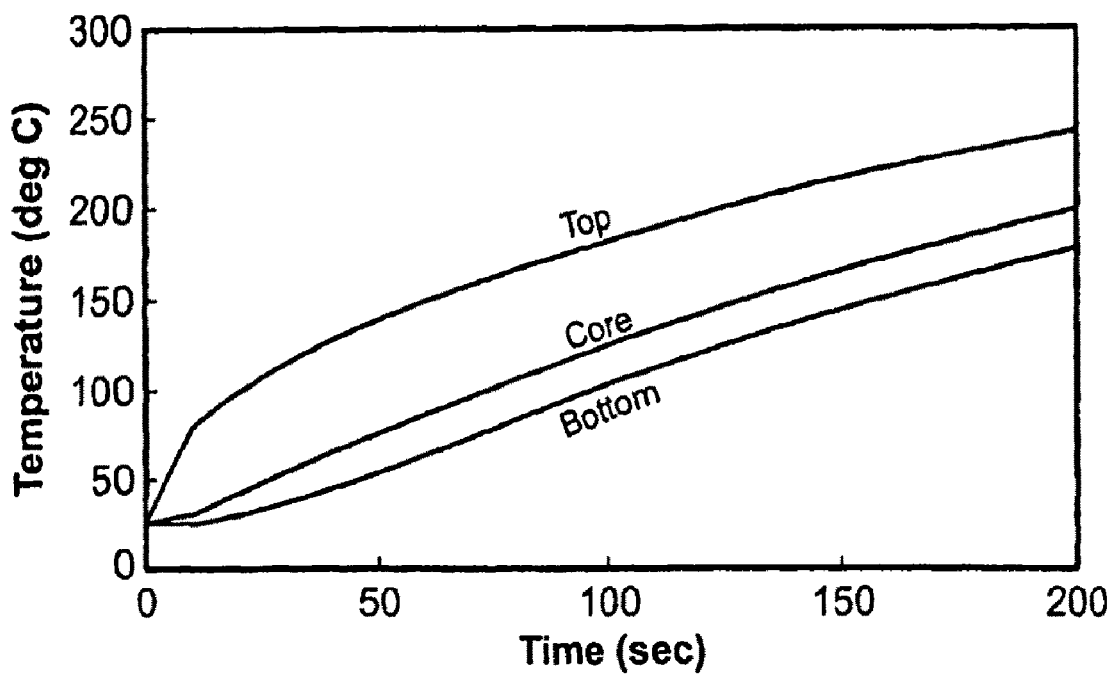
Figure 8:
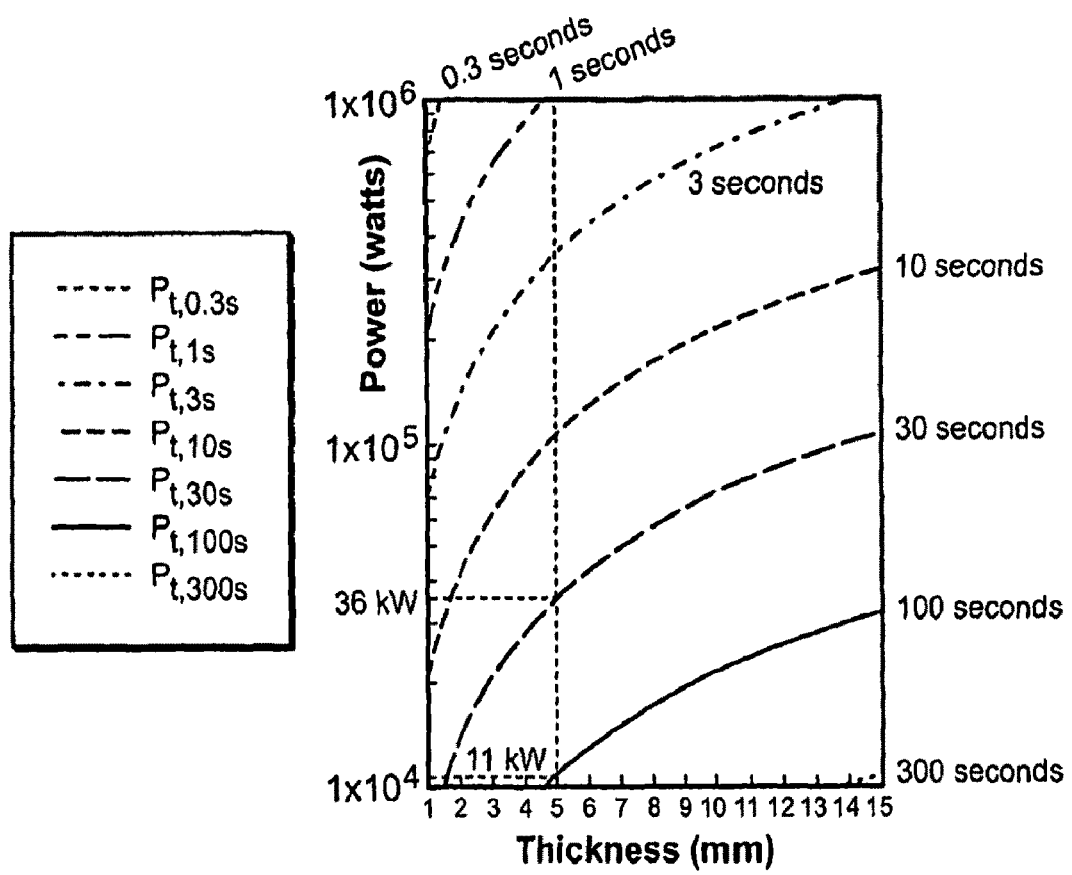
FIG. 8 presents modeling results for the thermal response of a three layered sheet system, where the power requirements are calculated based upon the thickness of the sheet and the desired heating time.

As illustrated in FIGS. 6 and 7, radiant heating exposes the top layer to heat, which must then be conducted to the lower layers. Conduction to the lower portions of the sheet may require a significant amount of time, 150 seconds, to bring the core temperature up to 160° C. The entire sheet reaches 160° C. at approximately 170 seconds, with approximately a 70° C. differential temperature between the top and bottom layers.

The above simulation results indicate that microwave heating may result in a faster heating cycle and a more uniform temperature distribution through the sample. Another difference observed when comparing microwave and radiant heating is the response of the sample following heating. For microwave heating, response to the power-off state is immediate, and the melt region is contained, as illustrated in FIGS. 4 and 5. In contrast, for radiant heating, an immediate response to the power-off state is more difficult to achieve, and melt regions are not contained, as illustrated in FIGS. 6 and 7.

As illustrated in FIGS. 4-7, selective microwave heating may result in A layers that are cooler than the B layers, and may result in higher melt strength in the A layers, and hence a broader processing window. The multilayer structure may also be specifically designed to provide an optimum temperature profile through the sheet for thermoforming, by varying the number, location, and thickness of each of the layers of microwave sensitive polymer, the proportion of microwave sensitive additive contained in each, and the applied power level. In this manner, the entire sheet may be heated rapidly to the desired temperature for thermoforming without exposing the surface of the sheet to the very high temperatures inherent in a radiant heating system, required to ensure sufficient "temperature driving force" to minimize the heating time required. The concept of selective heating of a layered structure may also facilitate accelerated cooling after forming due to the conduction of heat energy from the hotter (microwave heated) layers to the cooler (microwave transparent) layers during the forming and subsequent cooling phases. The microwave transparent layers may essentially act as "internal heat sinks" within the polymer structure.

Example 2

Decreased Heating Cycle Time

The models used to generate the results above were also used to estimate the effect microwave sensitive polymers can have on the thermoforming cycle, specifically the heating cycle. The time required to heat layered sheets (A/B/A polypropylene sheet, where 60% of thickness is the microwave sensitive core B) to typical thermoforming temperatures was estimated: the wattage required to heat a sheet of a specified thickness in a specified time was calculated, the results of which are presented in FIG. 8. The results indicate that power requirements around 100 kW may result in heating cycle times as low as 10 seconds for sheet 5 mm thick, which may represent a significant decrease in the cycle time. For thick sheets (10 mm or greater), cycle times of 300 seconds, comparable to that achieved with conventional heating systems, can be achieved but with significantly lower power requirements.

The cycle time estimated for microwave heating systems is compared with conventional thermoforming heating systems for sheet in Table 1. Again, for an A/B/A layered polypropylene sheet, where the B layer is microwave sensitive and is approximately 60 percent of the sheet thickness. The selective heating may result in a reduction of the heating cycle time by 90 percent or more, and may decrease the energy required for the heating by 75 percent.

TABLE 1

| | Conventional Thermoforming Station (width = 1 m) | | | Microwave Heating System (12-Cell, width = 1.032 m) | | | | |
|---|---|---|---|---|---|---|---|---|
| PP Sheet Thickness (mm) (A/B/A thickness) | Total Electrical Power Required (kW) | Cycle Time (s) | Total Energy Audit (kW-seconds) | Total Electrical Power Required (kW) | Cycle Time (s) | Total Energy Audit (kW-seconds) | Decrease in Cycle Time (%) | Decrease in Required Energy (%) |
| 10 (2/6/2) | 30 | 400 | 11800 | 100 | 30 | 3000 | 92 | 75 |
| 10 (2/6/2) | 30 | 400 | 11800 | 30 | 100 | 3000 | 75 | 75 |
| 5 (1/3/1) | 30 | 200 | 5900 | 51 | 30 | 1550 | 85 | 74 |
| 5 (1/3/1) | 30 | 200 | 5900 | 16 | 100 | 1600 | 49 | 73 |
| 2 (0.4/1.2/0.4) | 30 | 80 | 2400 | 59 | 10 | 590 | 87 | 75 |
| 2 (0.4/1.2/0.4) | 30 | 80 | 2400 | 21 | 30 | 620 | 62 | 74 |

Figure 9:
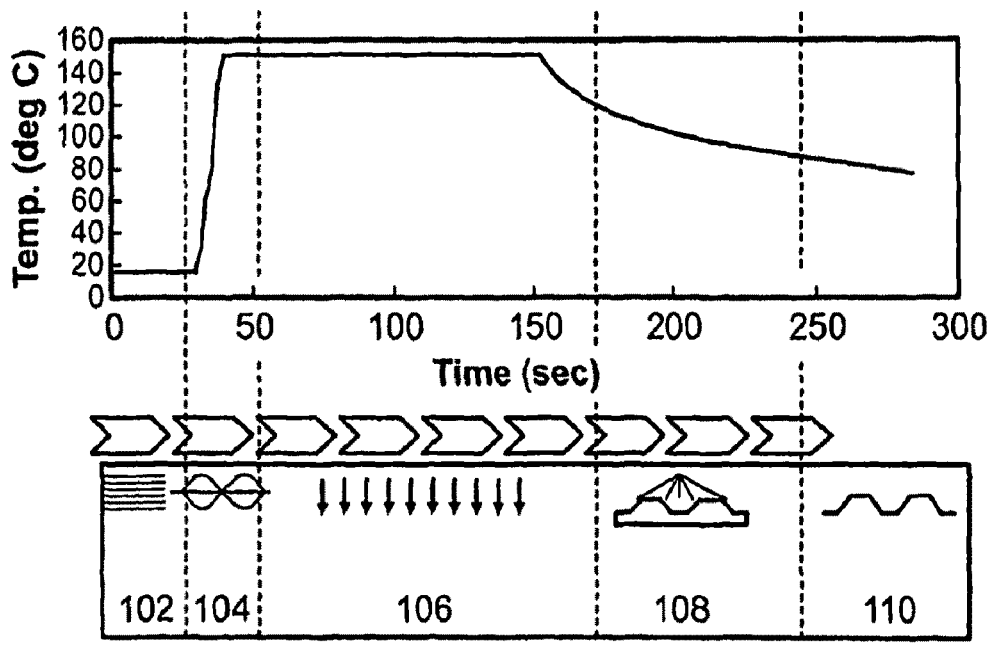
FIG. 9 illustrates one embodiment of a thermoforming process incorporating the selective microwave heating of a multilayered sheet.

Selective heating of sheet containing microwave sensitive polymer layer(s) may be performed in a process similar to that illustrated in FIG. 9. Sheet stock 102 may be fed to a microwave array 104, where the sheet may be heated to the desired temperature. The heated stock may then be forwarded, at temperature, to a thermoformer mold bed 106 with low power IR emitters, and then formed, cooled, and ejected 108 to form molded part 110.

The upper portion of FIG. 9 illustrates the above steps with the corresponding estimated time required for one example of thermoforming a sheet using selective heating and estimated polymer temperature throughout the process. For the time-temperature plot shown in FIG. 9, the sheet was a 6 mm thick polypropylene sheet having an inner core layer of microwave sensitive polypropylene (A/B/A=1.5 mm/3 mm/1.5 mm). The microwave heating array was at a power setting of 22 kW.

The time-temperature plot in FIG. 9 illustrates the significantly reduced heating time, approximately 30 seconds, for microwave sensitive polypropylene. In contrast, it is estimated that using conventional thermoforming/heating processes, heating would take approximately 200 seconds for polypropylene and 85 seconds for polystyrene, each of similar thickness. The significantly reduced heating times for microwave sensitive polymers may result in a lower part cost due to the decreased cycle time resulting from the reduced heating time.

The cycle time estimated for pulsed microwave heating systems for injection molding systems is compared with conventional injection molding heating systems in Table 2. The microwave sensitive polymer is heated with a pulse of microwave energy, melting a pellet containing non-receptive and microwave-sensitive or microwave receptive polymers. The melt is then injected into the cavity. Due to the conduction of heat from the receptive to the non-receptive polymer, the pellet/melt has an internal heat sink, enhancing the cooling cycle time. The cycle time reduction was estimated at 60 percent for thicker parts, approximately 25 percent for smaller parts.

TABLE 2

| PP Part Thickness (mm) | Initial cold core (non-receptive) pellet size (mm) | Overall (outer) pellet diameter (mm) | Time at injection point (s) | Conventional Cycle Time (s) | Internal Cooling Enhanced Cycle Time (s) | Percent Reduction in Cycle Time (%) |
|---|---|---|---|---|---|---|
| 10 | 6 | 6.93 | 10 | 300 | 120 | 60 |
| 5 | 4 | 2.24 | 1 | 72 | 57 | 21 |
| 2 | 2 | 2.24 | 1 | 10 | 7.5 | 25 |

Example 3

Heat Testing of Various Additives

Figure 13:
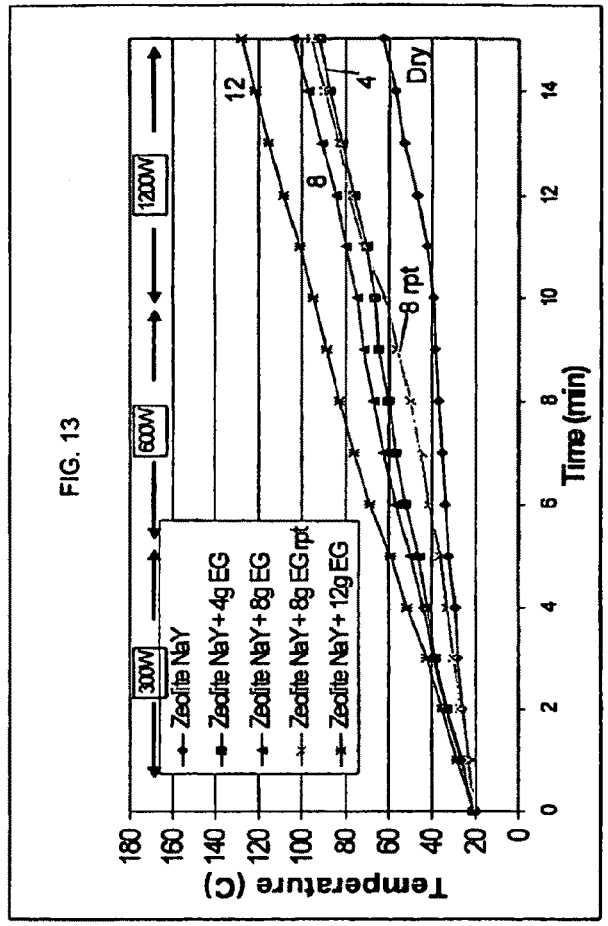
FIG. 13 presents a time-temperature plot of the microwave heating of zeolite NaY, with and without adsorbed ethylene glycol, useful in embodiments described herein.
Figure 14:
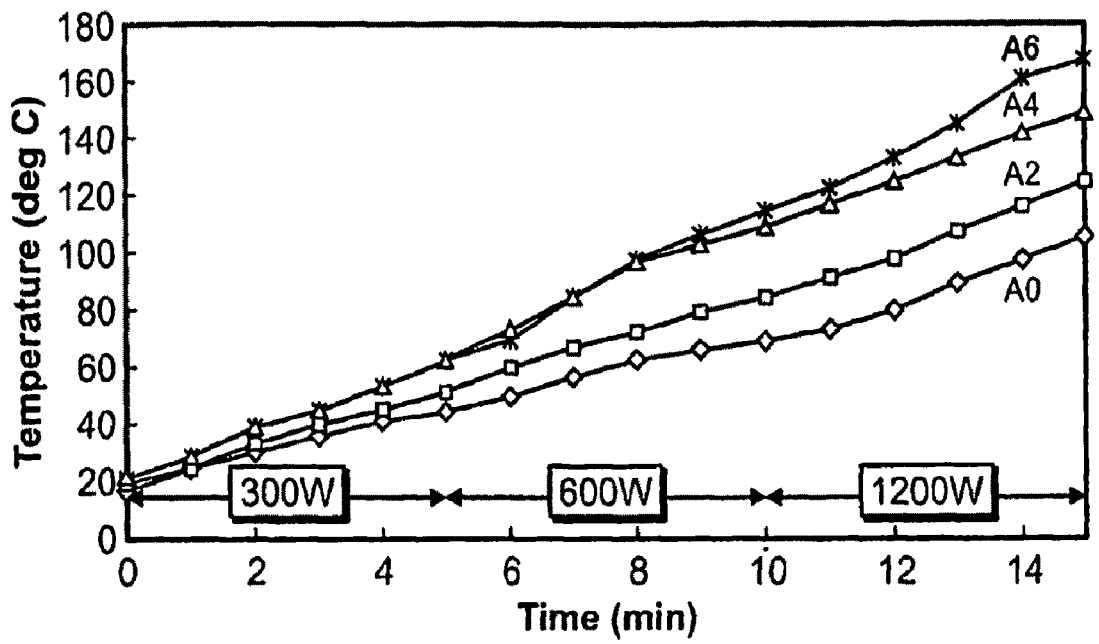
FIG. 14 presents a time-temperature plot of the microwave heating of an additive containing water useful in embodiments described herein.

Microwave properties of several fillers that may be useful in the microwave sensitive polymer were tested in mineral oil for their response to microwave energy. The additives were also compared to neat polypropylene for comparison. FIGS. 13 and 14 present microwave properties for 20 grams each of the fillers $BaTiO_3$ (available from Alfa Aesar), Zeolite A (molecular sieves 4 Å, available from Aldrich), $Fe_3O_4$ (available from Alfa Aesar), ethylene carbon monoxide (available from The Dow Chemical Company, Midland, Mich.), Cu Metal (available from Alfa Aesar), MYRANITE (available from Yeoman-Protex Limited, United Kingdom), and MYRASHIELD (available from Yeoman-Protex Limited, United Kingdom) dispersed as powders in 180 grams of light mineral oil (available from Aldrich).

Figure 10:
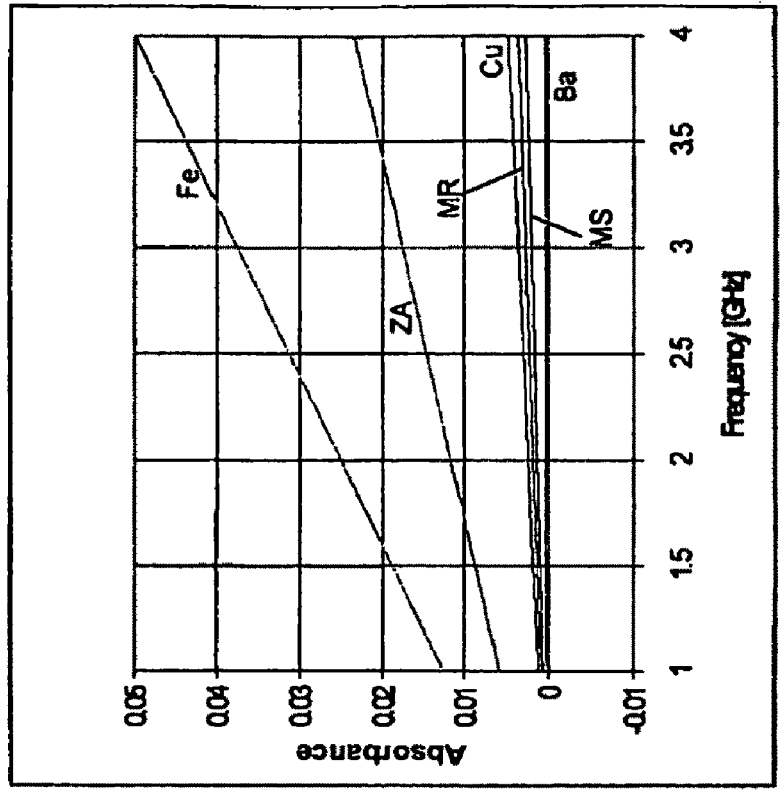
FIGS. 10 and 11 present microwave heating properties of various additives and polymer systems useful in embodiments described herein.

Referring to FIG. 10, time-temperature plots of $BaTiO_3$ (Ba), Zeolite A (ZA) $Fe_3O_4$ (Fe), Ethylene Carbon monoxide copolymer (ECO), and neat polypropylene (PP) are shown. The additives were mixed with mineral oil, placed in a MARS™ 5 instrumented microwave oven (available from CEM Corp., Matthews, N.C.); the microwave power was turned on at 300 W for 5 minutes, 600 W for an additional 5 minutes, and 1200 W for another 5 minutes. The temperature of the mixture was measured throughout the 15 minutes. ECO had the greatest response over the duration of the experiment, with an increase in temperature of approximately 110° C. Fe increased approximately 60° C. and ZA increased approximately 30° C. ECO and Fe appeared to have the quickest response, as can be seen by the temperature gradient (slope) for the first two minutes of heating.

Figure 11:
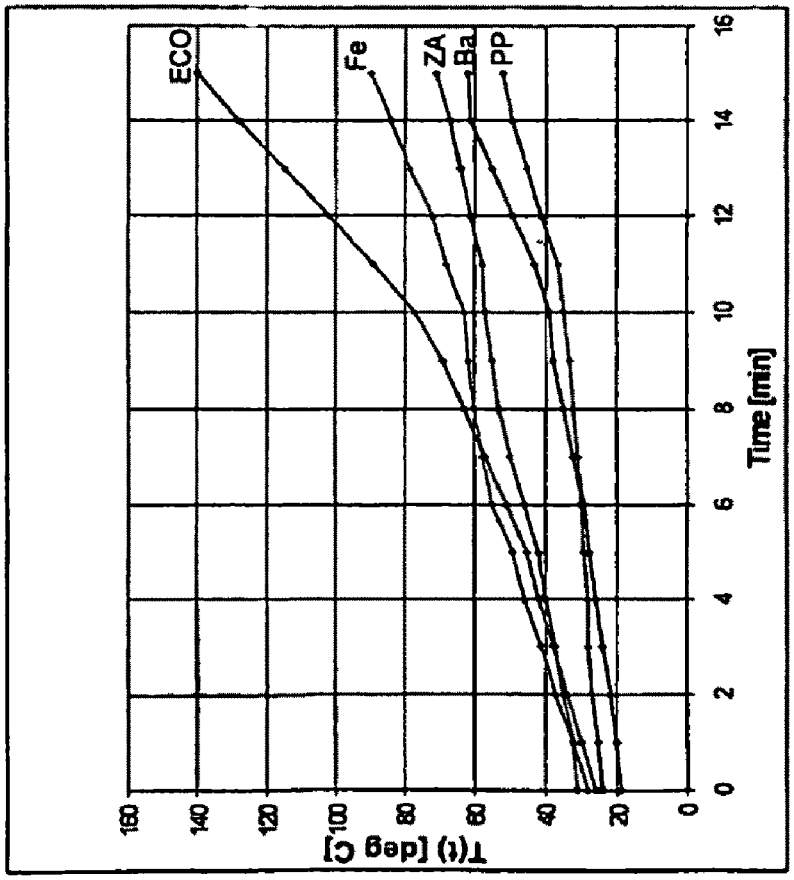

Referring to FIG. 11, regressed absorbance data for Ba, ZA, Fe, copper metal (Cu), MYRANITE (MR) and MYRASHIELD (MS) are shown. Fe and ZA have the greatest absorbance over a wide range of frequencies, indicating their flexibility for microwave heating.

Figure 12:
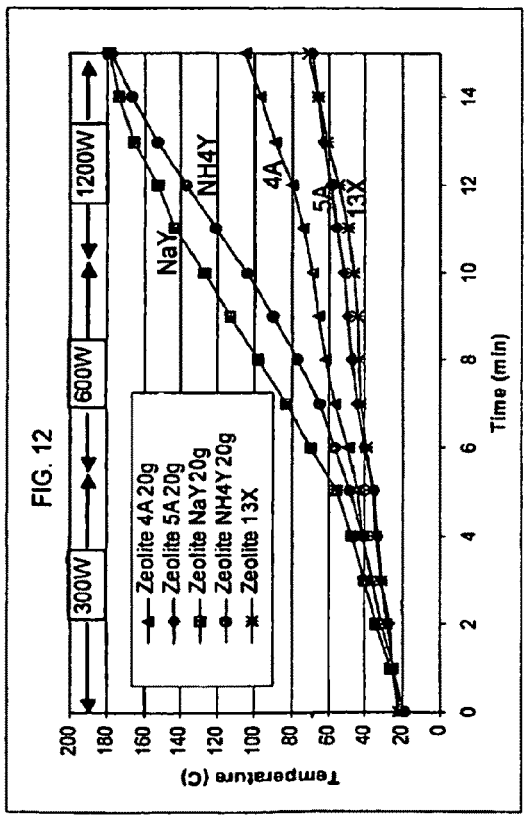
FIG. 12 presents a time-temperature plot of the microwave heating of various zeolites useful in embodiments described herein.

Referring to FIG. 12, a time-temperature plot of different zeolites (4A, 5A, NaY, $NH_4Y$, and 13X, all as received from the supplier) in oil, heated in a MARS™ 5 instrumented microwave oven as described above, is shown. Zeolites 13X and 5A (each available from Aldrich) exhibited similar heating characteristics. Zeolite 4A (available from Aldrich) increased in temperature slightly more rapidly than did zeolites 13X and 5A. Zeolite NaY (Aldrich) and $NH_4Y$ (Aldrich), exhibited the largest increase in temperature, and had a similar temperature change at the conclusion of the experiment. However, zeolite NaY increased in temperature more rapidly at lower power settings than did zeolite $NH_4Y$. Thermogravimetric analysis shows that the as-received zeolites NaY and $NH_4Y$ each contained significant amount of water, whereas the 4A, 5A and 13X contained relatively minor amounts of water (i.e. these were received as the activated form).

Referring to FIG. 13, time-temperature plots for 20 grams of zeolite NaY, dried at 120° C. and including the indicated mass of absorbed ethylene glycol, in 180 grams of mineral oil, heated in a MARS™ 5 instrumented microwave oven as described above, are shown. The sample containing the most ethylene glycol, 12 grams, had the highest rate of temperature increase, and the dry zeolite had the lowest rate of temperature increase. This example illustrates the improvement in microwave heatability when a zeolite having absorbed a microwave receptive compound, such as ethylene glycol, is added to a thermoplastic polymer to form a microwave receptive polymer.

Referring to FIG. 14, a time-temperature plot of zeolite 4A (molecular sieves 4 Å, available from Aldrich), with and without added water, heated in a MARS™ 5 instrumented microwave oven as described above, is shown. Sample A0 had no added water; A2 had 2 grams additional water; A4, 4 grams; and A6, 6 grams. Again, the additives were mixed with oil, placed in a MARS™ 5 instrumented microwave oven (available from CEM Corp., Matthews, N.C.); the microwave power was turned on at 300 W for 5 minutes, 600 W for an additional 5 minutes, and 1200 W for another 5 minutes. The temperature of the mixture was measured throughout the 15 minutes. Due to the heating of the water, the samples with greater amounts of water had the greatest temperature change. This example illustrates the improvement in microwave heatability when a zeolite having absorbed a microwave receptive compound, such as water, is added to a thermoplastic polymer to form a microwave receptive polymer.

Figure 15:
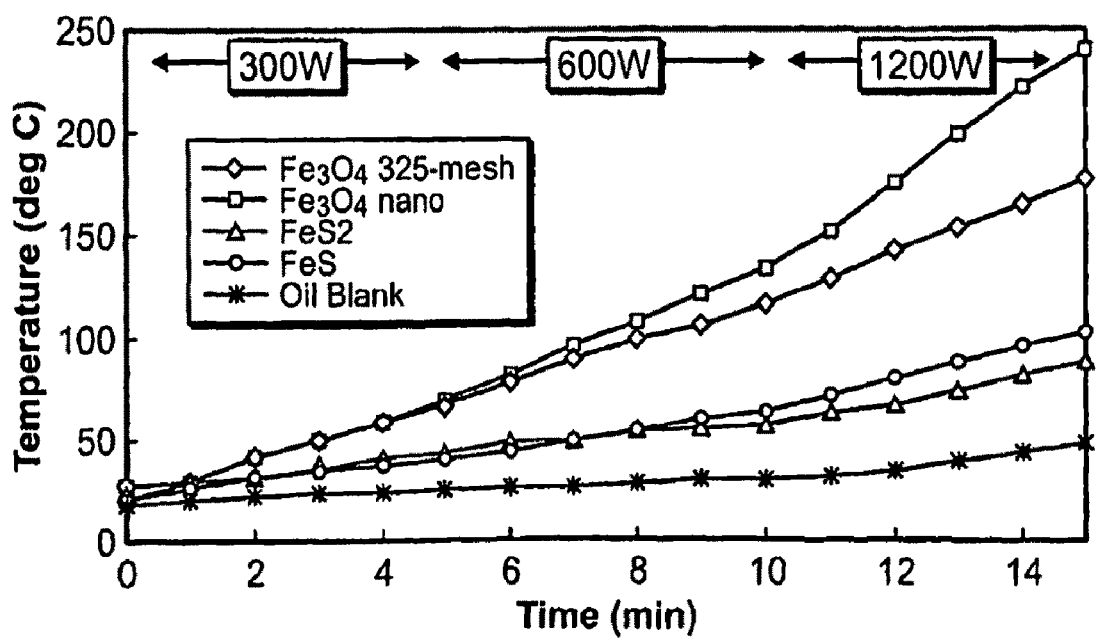
FIG. 15 presents a time-temperature plot of the microwave heating of various microwave-sensitive additives useful in embodiments described herein.

Referring to FIG. 15, a time-temperature plot for various iron oxides and sulfides heated in a MARS™ 5 instrumented microwave oven as described above, is shown. Additives used during these experiments included $Fe_3O_4$, and two different iron sulfides, an iron pyrite ($FeS_2$, Alfa Aesar) and a ferrous sulfide (FeS, Aldrich). Two particle sizes of the iron oxide Fe3O4 were analyzed, one being described as 325 mesh powder (Alfa Aesar) and the other being described as a 40-60 nanometer sized powder (Alfa Aesar). Again, the samples were examined as suspensions of 20 grams of inorganic powder in 180 grams light mineral oil. The additives were mixed with oil, placed in a MARS™ 5 instrumented microwave oven (available from CEM Corp., Matthews, N.C.); the microwave power was turned on at 300 W for 5 minutes, 600 W for an additional 5 minutes, and 1200 W for another 5 minutes. The temperature of the mixture was measured throughout the 15 minutes.

Due to their magnetic nature, the iron oxides show very effective microwave sensitivity, reaching temperatures 125 to 200° C. higher than the oil blank. The finer, nanometer-sized, iron oxide powder heated more effectively than did the 325-mesh powder. The iron sulfides also show microwave sensitivity, and reach temperatures 40 to 50° C. higher than the oil blank.

Figure 16:
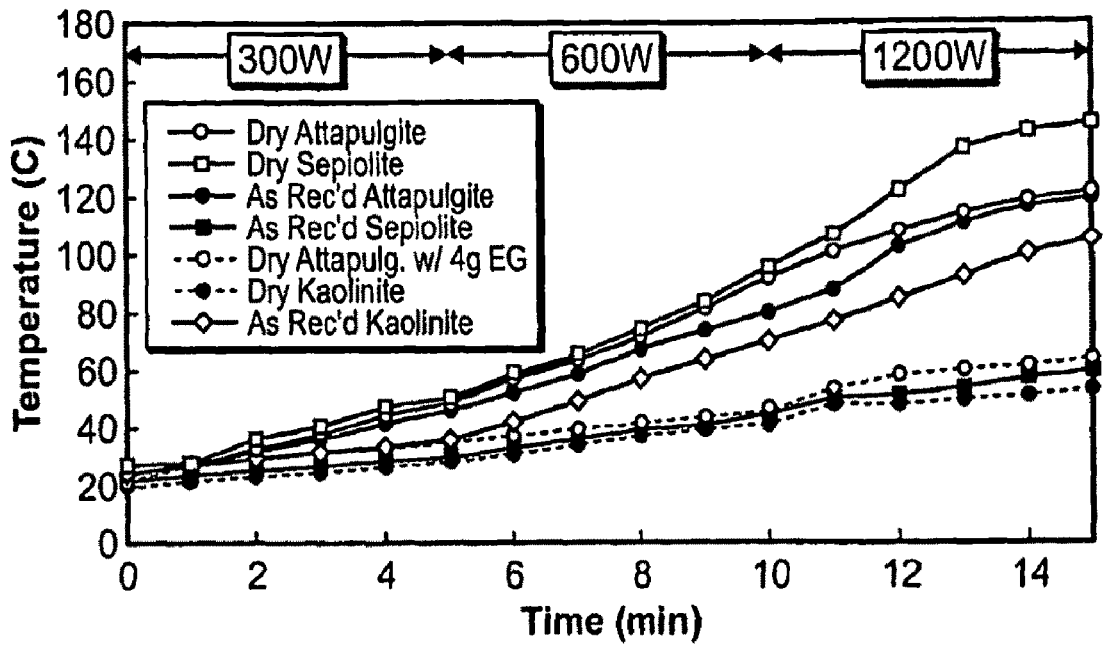
FIG. 16 presents a time-temperature plot of the microwave heating of various microwave-sensitive additives useful in embodiments described herein.

Referring to FIG. 16, a time-temperature plot for various dry and as-received clay minerals heated in a MARS™ 5 instrumented microwave oven as described above, is shown. The clay minerals examined included kaolinite (Hydrafine no. 1, Huber Engineered Materials), attapulgite (PF1-1, Source Clay Minerals Repository, University of Missouri—Columbia), and sepiolite (Pangel S-9, Tolsa Group, Spain). Each were examined as suspensions of 20 grams of inorganic powder in 180 grams light mineral oil and heated as described above. In addition to analyzing the microwave sensitivity for the various additives, these experiments also examined the effect of removing moisture by heating the as-received materials.

The dried kaolinite, attapulgite and sepiolite exhibited very poor microwave sensitivity. In contrast, the presence of moisture in the as-received materials rendered them very effective, microwave-sensitive materials. Thus it is not necessary to add water directly to these and similar additives, which may be provided in a very effective form. Ethylene glycol was also added to a sample of dried attapulgite. Similar to the improved sensitivity due to moisture, the addition of 4 grams of ethylene glycol to the porous attapulgite can dramatically improve the microwave sensitivity for this material.

Figure 17:
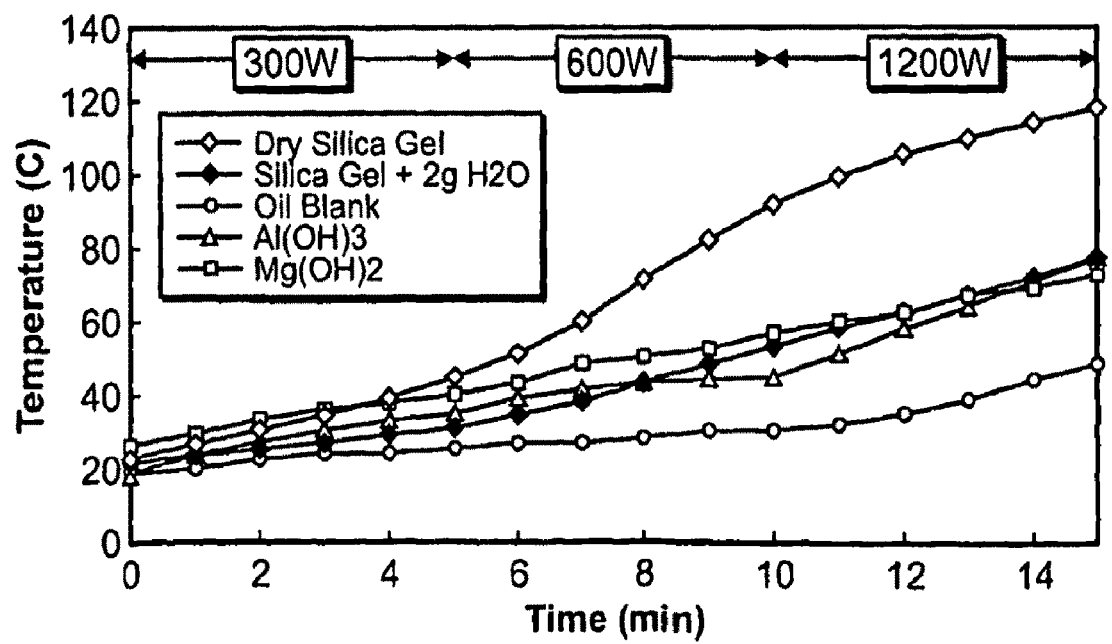
FIG. 17 presents a time-temperature plot of the microwave heating of various microwave-sensitive additives useful in embodiments described herein.

Referring to FIG. 17, a time-temperature plot, for dried and hydrated silica gel and various metal hydroxides heated in a MARS™ 5 instrumented microwave oven as described above, is shown. Again, each sample was tested as suspensions of 20 grams of inorganic powder in 180 grams light mineral oil, and heated stage-wise as described above. The additives tested for microwave sensitivity included silica gel, aluminum hydroxide ($Al(OH)_3$, available from Aldrich), and magnesium hydroxide ($Mg(OH)_2$, available from Johnson Mathey). The aluminum hydroxide and magnesium hydroxide showed intermediate heating behavior, thus these may be mildly effective as microwave sensitizing additives. The dry silica gel had low microwave sensitivity. However, the microwave sensitivity of the silica gel was strongly enhanced by adsorbed water, as illustrated by the results for the silica gel sample having 2 grams of water added.

Figure 18:
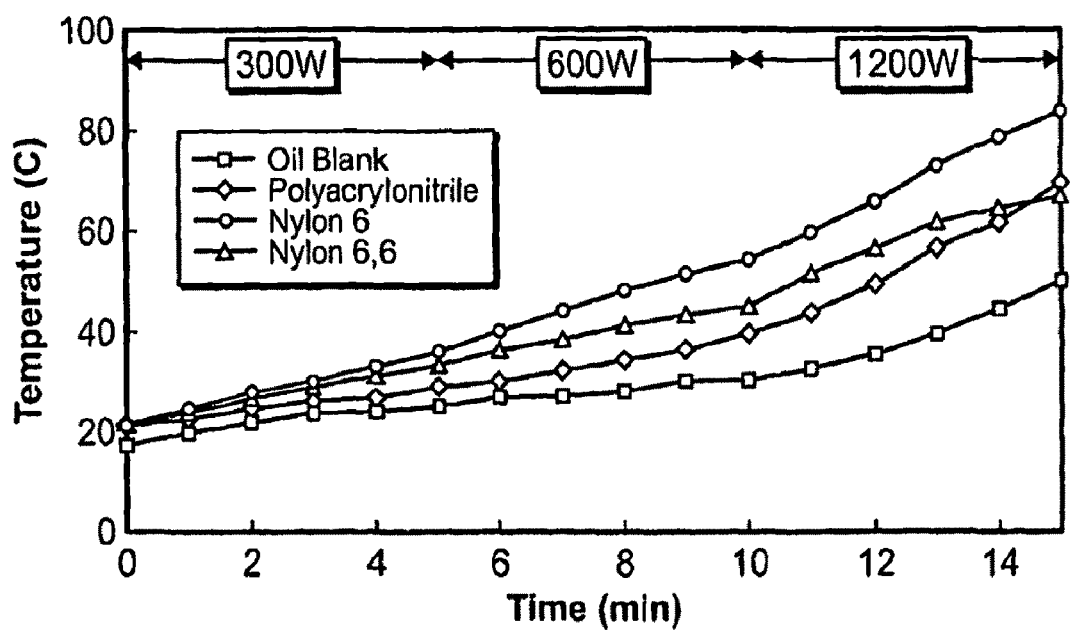
FIG. 18 presents a time-temperature plot of the microwave heating of various microwave-sensitive additives useful in embodiments described herein.

Referring to FIG. 18, a time-temperature plot, for various microwave-sensitive polymeric materials heated in a MARS™ 5 instrumented microwave oven as described above, is shown. Again, 20 gram portions of three polymeric materials, Nylon 6, Nylon 6/6, and polyacrylonitrile (each available from Aldrich), were added to 180 grams of mineral oil, and heated stage-wise as described above. These polar polymers may provide microwave sensitivity when compounded into an insensitive matrix, as illustrated by the heat rise compared to the oil blank. The results also indicate that Nylon 6 was more effective as a microwave-sensitive additive than either Nylon 6/6 or polyacrylonitrile.

Example 4

Heat Testing of Microwave Sensitive Polymers

Figure 19:
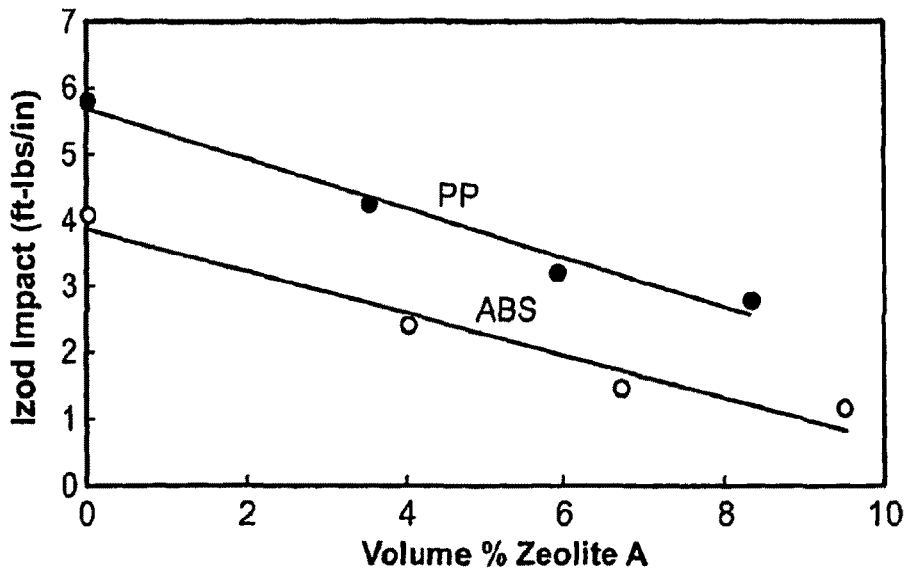
FIG. 19 presents Izod impact data for PP and ABS with and without microwave sensitive additives.

Of the above fillers, zeolite A (Aldrich, molecular sieves 4 Å, catalog no. 233668) and $Fe_3O_4$ (Alfa Aesar, catalog no. 12374) were selected for evaluation in selective heating processes. Criteria used to select these two additives included effectiveness (response as described above in relation to FIGS. 13 and 14), cost, and required loading of the additives, environmental, health and safety concerns. The expected impact that the additives may have on polymer properties (based upon particle size, morphology, and other properties) were also considered. For example, FIG. 19 presents laboratory data illustrating the decrease in Izod Impact that Zeolite A can have on PP and ABS.

Figure 19A:
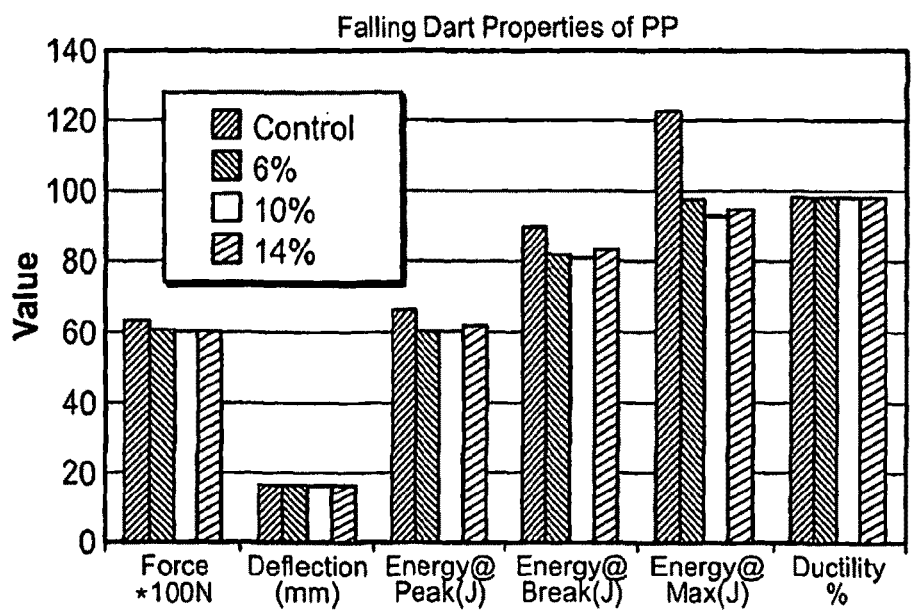
FIG. 19A presents Falling Dart data for coextruded PP with and without microwave sensitive additives.

However, it has been found that impact values for coextruded sheet having exterior microwave transparent layers may not be significantly influenced by the microwave-receptive additive, as illustrated in FIG. 19A. FIG. 19A presents Falling Dart data for 20/60/20 coextruded polypropylene sheets having a 4 mm total thickness, where the interior layer contains zeolite at the indicated concentrations (control has zero zeolite). As indicated by the results, coextruded microwave-sensitive polymers may have similar physical properties, including impact and ductility.

The chosen additives were used at four loading levels (approximately 3, 6, 10, and 14 weight percent) in polymer sheets of varying thickness (3, 6, and 10 mm), where the polymers included ABS, HIPS, PP, and Conductive TPO. The microwave heating of the polymer sheets was then tested in an apparatus similar to that illustrated in FIG. 1, described above (microwave heating apparatus 20 includes components such as tuning pistons 21, EH tuner 22, matching iris plates 23, waveguide 24, horn 25, microwave choke 27, lower moveable piston 28, and sample feed slot 29). Sheets were processed through the microwave heating apparatus by feeding the samples through the sample feed slot. The test apparatus was capable of rapid and uniform heating of polymers, and could adapt to the material nature and form (receptor type, receptor concentration, matrix type, and sample thickness and shape). The test apparatus included a 2.54 GHz variable power source, and a WG9A waveguide connection into the horn, providing a uniform energy density spread. The iris plates and EH tuner allowed for fine tuning of the wavelength emitted. Analytical measurement devices (not shown) were also provided to monitor the temperature of the polymer sheet being processed, among other variables.

Figure 20:
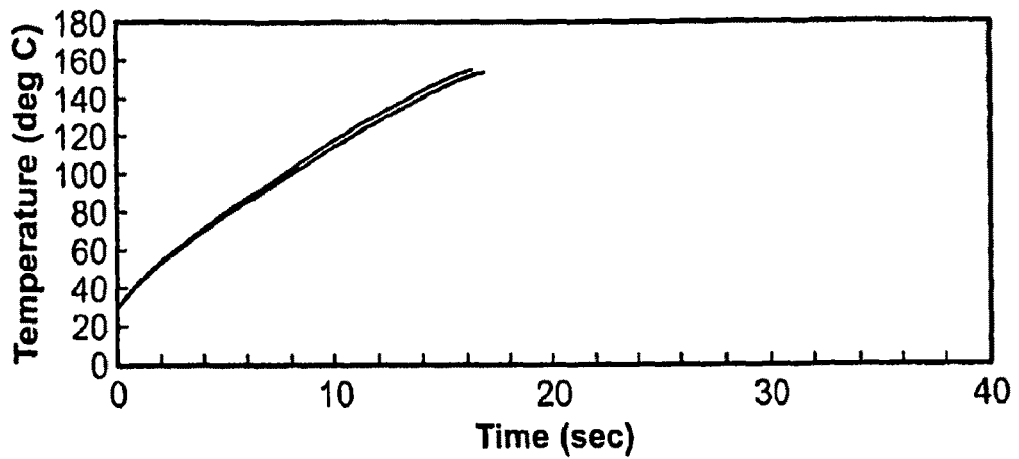
FIG. 20 presents the time-temperature response for the microwave heating of a polypropylene sheet useful in embodiments described herein.

Referring now to FIG. 20, a polypropylene sheet, 6 mm thick, having 6 weight percent Zeolite A was heated using the microwave heating apparatus at a power setting of 1100 Watts, and the temperature of the sheet was measured as a function of time. The sheet increased from room temperature to approximately 155° C. in about 17 seconds, indicating a rapid heating cycle.

Figure 21:
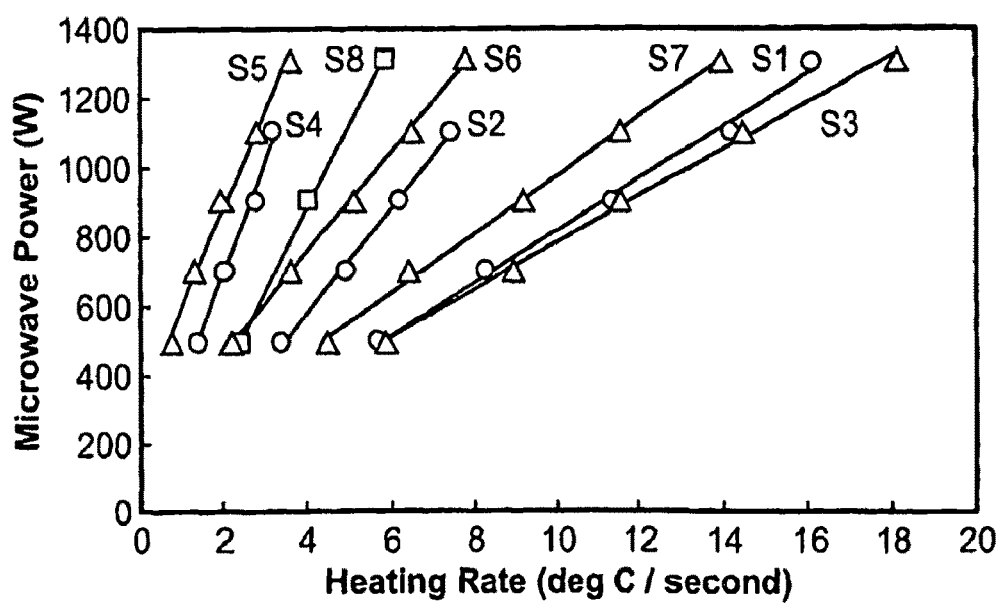
FIG. 21 presents the measured heating rate as a function of microwave power for several polymers containing Zeolite A, a microwave receptive additive.

Referring to FIG. 21, the measured heating rate as a function of microwave power for several samples containing Zeolite A is shown. Eight samples as described in Table 3 were prepared. The increase in temperature of the samples was measured as the samples were heated at a constant microwave power. At moderate to high power settings, Samples 1, 3, and 7 exhibited rapid heating rates (greater than about 7° C. per second); Samples 2, 6, and 8 moderate heating rates (2 to 6° C. per second); and Samples 4 and 5 slow heating rates (less than about 2° C. per second).

TABLE 3

| Sample No. (#) | Polymer Base (type) | Sheet Thickness (mm) | Zeolite A Content (weight percent) |
|---|---|---|---|
| 1 | PP | 6 | 14 |
| 2 | PP | 6 | 6 |
| 3 | ABS | 6 | 14 |
| 4 | PP | 10 | 14 |

TABLE 3-continued

| Sample No. (#) | Polymer Base (type) | Sheet Thickness (mm) | Zeolite A Content (weight percent) |
|---|---|---|---|
| 5 | ABS | 3 | 3 |
| 6 | ABS | 3 | 10 |
| 7 | ABS | 6 | 10 |
| 8 | TPO | 6 | 0 |

Figure 22:
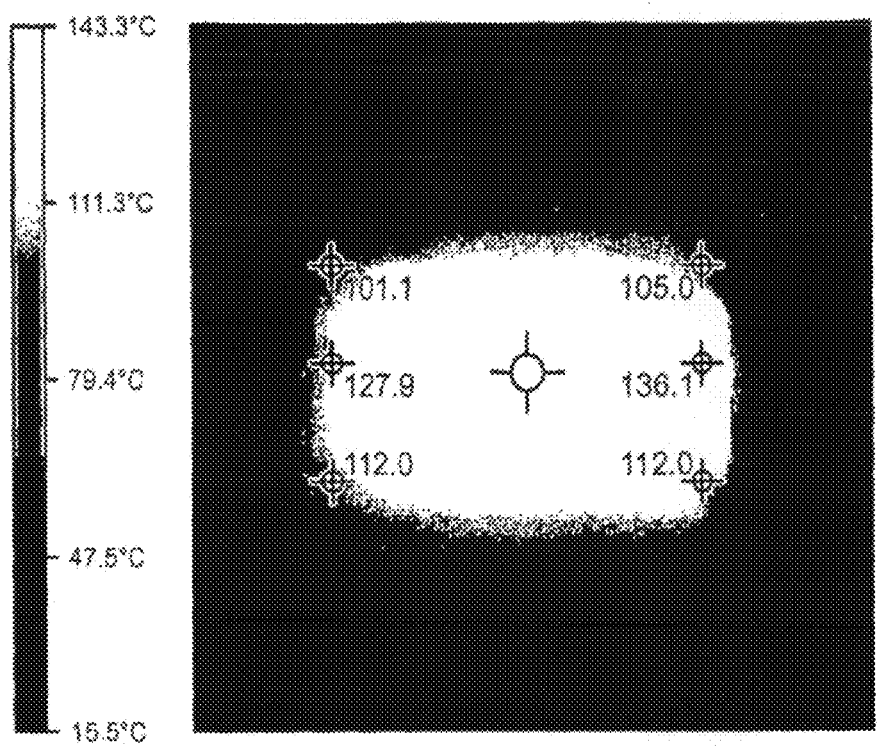
FIG. 22 presents the temperature profile measured for a sample of sheet being heated in a microwave heating apparatus, illustrating the uniform heating that can be achieved with selective microwave heating.

Referring to FIG. 22, the temperature profile measured for a sample in motion being heated in a microwave heating apparatus shown. The sample was a nylon strip, 6 mm thick, 85 mm in width, and 500 mm in length. The sample moved through the apparatus at a rate of 400 mm/min at a power setting of 500 W. FIG. 22 presents a snapshot in time of the stabilized temperature profile resulting from the heating, and illustrates the uniform heating that can be achieved with selective microwave heating.

Figure 23:
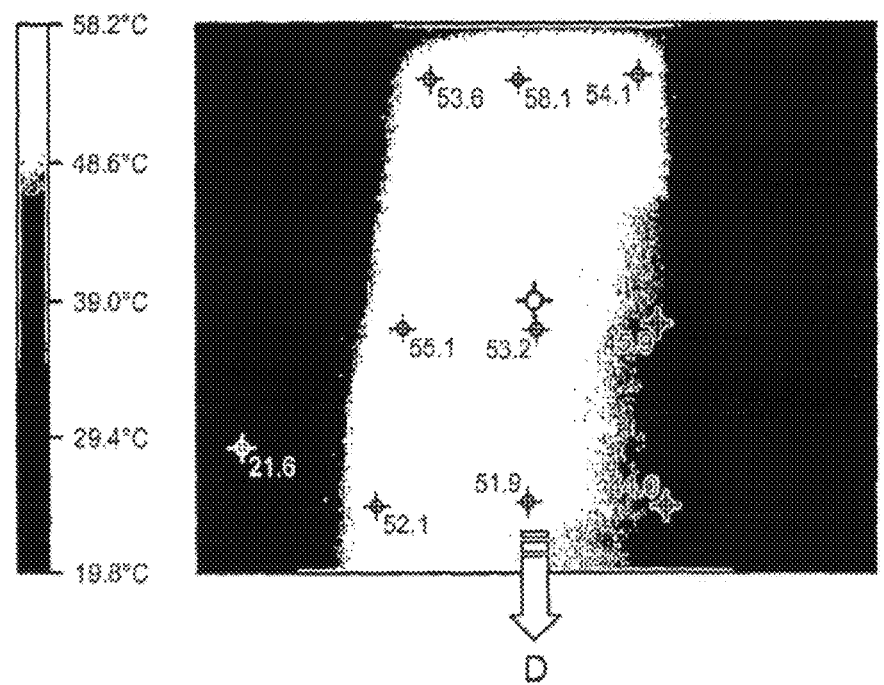
FIG. 23 presents a temperature profile measured for an A/B/A sheet sandwich sample being heated in a microwave heating apparatus, illustrating the uniform heating that can be achieved with selective microwave heating.

Referring to FIG. 23, a temperature profile measured for an A/B/A sandwich sample being heated in a microwave heating apparatus is shown; the A layers were non-receptive to microwaves, the B layer was receptive. Experimental results confirmed that the layered concept provides a uniform heating band, similar to that predicted by E-field modeling as described above.

Figure 24:
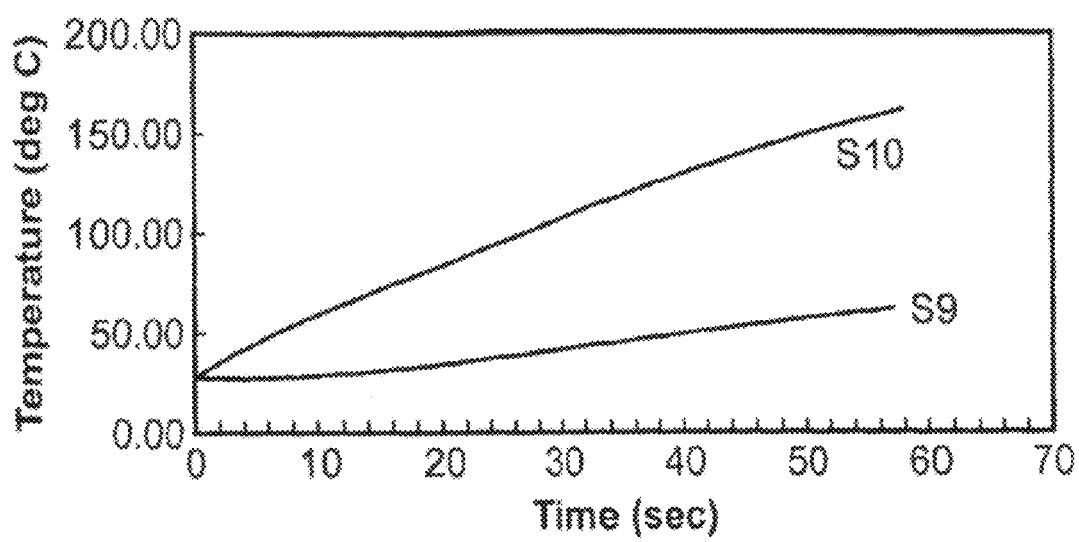
FIG. 24 presents the heating characteristics measured for two PP samples of a three layered sheet comprising a core layer of microwave sensitive material.
Figure 25:
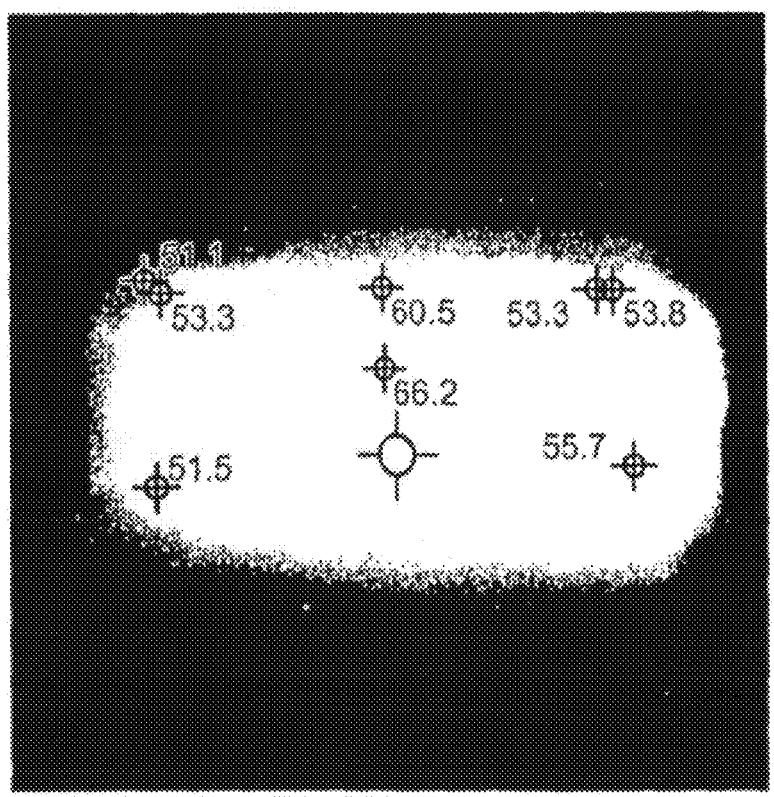
FIG. 25 presents a temperature snapshot of the heating profile for one of the two PP samples in FIG. 24, where the snapshot was taken two minutes into the heating process.

Referring now to FIG. 24, the heating characteristics measured for two 3 mm PP samples of a three layered sheet comprising a core layer of microwave sensitive material bounded by outer layers of a polymer transparent to microwave energy are shown. For both samples, the core layer contained 10 weight percent Zeolite A. Sample 9 had a top layer (outer skin), whereas Sample 10 did not have a top layer. The samples were exposed to microwave energy at a power setting of 500 W. Sample 9, having a top layer, heated much slower than Sample 10, not having a top layer. FIG. 25 presents a time-temperature snapshot of the heating of Sample 9 two minutes from the start of the test, illustrating again how the outer layers lag behind as thermal conductivity transfers heat from the microwave sensitive layer to the outer layers. In this manner, the outer layers may act as a carrier for a low melt strength core.

Figure 26:
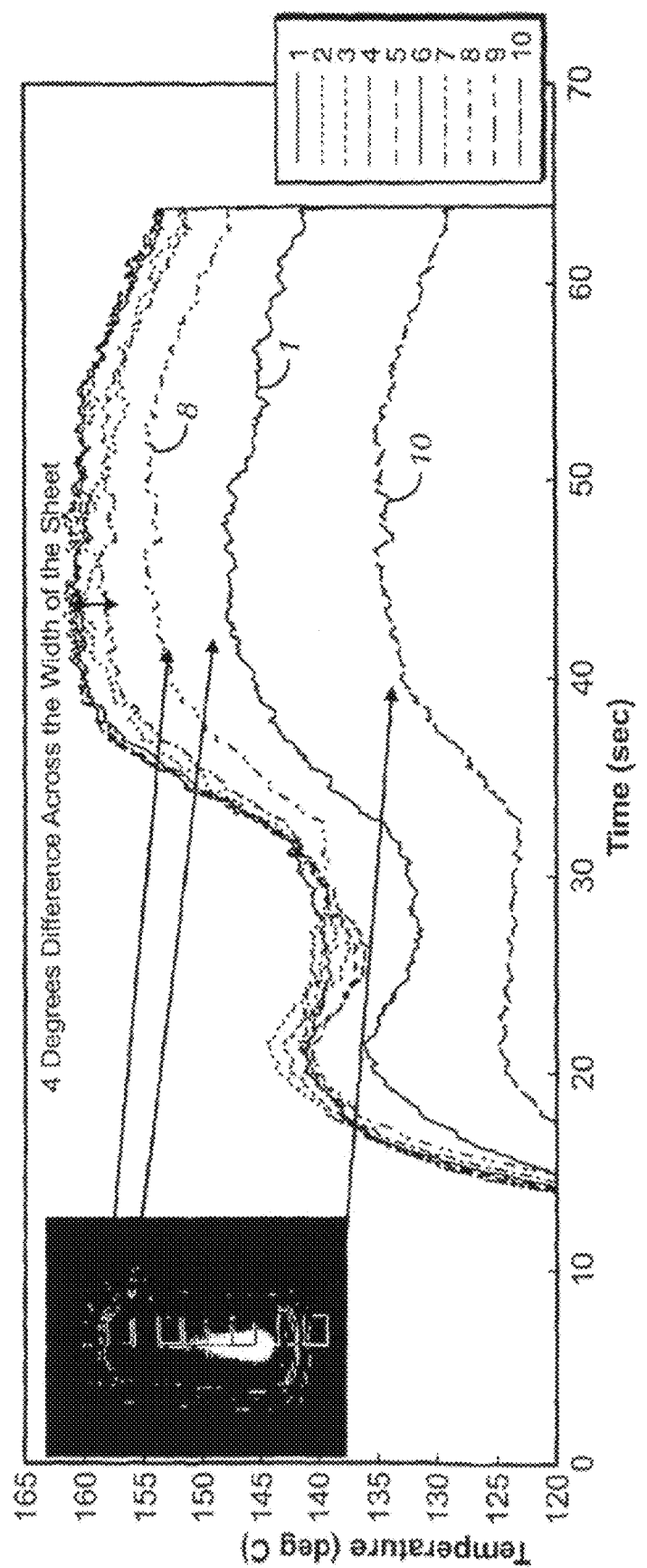
FIG. 26 presents a temperature snapshot of a heating profile for a PP sample heated using a microwave heating/thermoforming apparatus similar to that illustrated in FIG. 1.

Referring now to FIG. 26, a temperature snapshot of the heating of a polypropylene sample (4 mm thick 20/60/20 co-extruded PP material with 14% zeolite A in the core material) using a microwave heating apparatus and thermoforming station as illustrated in FIG. 4 is illustrated. The polypropylene sheet contains 14 weight percent of a microwave receptive additive (Zeolite A) and is heated in a microwave heating apparatus having a power rating of 1.5 kilowatts as the polymer sheet is passed through the microwave heating apparatus at a rate of 3 mm/second. Microwave energy was directed only toward the central portion of the sheet, selectively heating that portion of the sheet to be molded. As can be seen in FIG. 26, the temperature profile across the heated section varied by only 4 degrees Celsius, illustrating sufficiently uniform heating across the sample width for forming the desired molded part.

As another example, thermoforming a sheet into a refrigerator liner requires the polymer to have a good balance of stiffness and toughness, sufficiently high low-temperature impact properties, good ESCR, and good temperature resistance. Additionally, the polymer must have a deep draw processing window, having good melt strength and limited sag. The A/B/A layered polymer, having improved melt strength and decreased sag during thermoforming as a result of the reverse temperature profile may enable the thermoforming of TPO sheet for refrigerator liners and similar thick sheet applications.

Embodiments of the present invention provides for rapid, volumetric heating of a thermoplastic material. Embodiments provide for selective heating of discrete parts of a thermoplastic structure, such as individual layers in a laminated or co-extruded multilayer structure, for example. Other embodiments provide for pulsed microwave energy resulting in regions of heated and unheated microwave receptive material. Some embodiments provide for selective placement of the microwave emitters providing for heating of specific regions of a part. In other embodiments, selective microwave heating, having high penetration efficiency, allows near simultaneous heating of the core layer and the skin layers, especially as compared to the slow conductive transfer of radiant heat from one or both outer layers through the polymer.

Embodiments disclosed herein may be used for the selective microwave heating of thermoplastic polymer materials. With regard to polymer processing, this technology offers many advantages for designers and processors, including selective, rapid heating; reduced heating/cooling cycle times (high speed); high energy efficiency and other environmental benefits such as reduced emissions (as it is a dry and fumeless process) and increased recycling potential (through enabling the more widespread use of self-reinforced single material components); preservation of properties in self-reinforced parts (reduces risk of reversion); increased productivity; improved part quality and strength; and minimization of thermal degradation due to reduced residence time in a thermal process, and therefore thermal stabilization additives can be reduced in polymer formulation.

Advantageously, embodiments disclosed herein may provide reduced heating times, reducing overall fabrication cycle time and hence reduced piece part cost. Embodiments disclosed herein may also provide reduced cooling times as a result of the use of selective heating, introducing "heat sinks" within a material that is being processed. Additionally, volumetric heating eliminates the need for "surface" or "contact" heating and therefore eliminates the potentially deleterious effects of high polymer surface temperatures. Volumetric heating also eliminates the undesirable temperature gradient across the sheet thickness.

Embodiments disclosed herein may also advantageously provide improved productivity through reduced overall cycle times and reduced system energy requirements. Embodiments disclosed herein may also provide tailored thermal profiling providing optimum thermoforming conditions for all thermoplastic materials and, in particular, enabling the thermoforming of thick thermoplastic polyolefin sheet, which otherwise has an unacceptably narrow processing window.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A microwave-sensitive thermoplastic composition comprising:
  a microwave-receptive additive; and
  a thermoplastic polymer;
  wherein the microwave-receptive additive is selected from the group consisting of molecular sieves formed from ammonium ion salts or hydrogen ion salts, alumino-phosphates, silicoaluminophosphates, silicotitanates, molecular sieves or zeolites having a caged organic microwave receptive material, and combinations thereof.

2. The microwave-sensitive thermoplastic composition of claim 1, wherein the molecular sieve formed from ammonium ion salts comprises the ammonium faun of molecular sieve Y.

3. The microwave-sensitive thermoplastic composition of claim 1, wherein the microwave-receptive additive has an average particle size in the range from 0.1 nm to 50 microns.

4. The microwave-sensitive thermoplastic composition of claim 1, further comprising an additional microwave-receptive additive selected from the group consisting of magnetic or conductive elements, heavy metal salts, salt hydrates, complex hydrates, simple hydrates, metal oxides, complex oxides, metal sulfides, metal carbides, metal nitrides, semiconductors, ion conductors, water-containing materials, molecular, oligomeric, or polymeric materials with permanent dipoles, cased dipoles, organic conductors, magnetics, and combinations thereof.

5. The microwave-sensitive thermoplastic composition of claim 4, wherein the microwave-receptive additive and the additional microwave-receptive additive each has an average particle size in the range from 0.1 nm to 50 microns.

6. The microwave-sensitive thermoplastic composition of claim 4, wherein the additional microwave-receptive additive is selected from the group consisting of carbon nanotubes, graphenes, ettringites, epsom salts, iron pyrites, TiN, $B_4C$, Si, GaAs, InP, solid acids, beta aluminums, polymer acids, ion exchangers, and combinations thereof.

7. The microwave-sensitive thermoplastic composition of claim 4, wherein the additional microwave-receptive additive is selected from the group consisting of zeolites, silicas, aluminas, titania gels, and combinations thereof.

8. The microwave-sensitive thermoplastic composition of claim 7 wherein the microwave-selective additive is hydrated to for hydrated zeolites, hydrated silicas, hydrated aluminas, hydrated titania gels, and combinations thereof.

9. The microwave-sensitive thermoplastic composition of claim 4, wherein the additional microwave-receptive additive is selected from the group consisting of hydrogels, microencapsulated water, and combinations thereof.

10. The microwave-sensitive thermoplastic composition of claim 4, wherein the additional microwave-receptive additive is selected form the group consisting of sugars, amino acids, lactams, ethylene carbon monoxide polymers, polyamides, polyesters, starches, keratins, gelatins, formamide, n-methylacetamide, and combinations thereof.

11. The microwave-sensitive thermoplastic composition of claim 10, wherein the microwave-receptive additive is caged, encapsulated, or adsorbed in zeolites, clays, or on silica gel, or combinations thereof.

12. The microwave-sensitive thermoplastic composition of claim 4, wherein the additional microwave-receptive additive is selected from the group consisting of polyanilines, polypyrroles, polyacetylenes, Sr, Ba titanates, NiZn, MnZn, and combinations thereof.

13. The microwave-sensitive thermoplastic composition of claim 4, wherein the additional microwave-receptive additive is selected from the group consisting of C, CO, Ni, Fe, Zn, Al, Mo, $CuX_n$, where n is an integer from 1 to 6 and X is a halogen, $ZnX_2$ or $SnX_2$ where X is a halogen, $NiCl_2 \cdot 6H_2O$, $Al_2(SO_4)_3 \cdot 18\ H_2O$, CuO, NiO, $Fe_3O_4$, $CO_2O_3$, $BaTiO_3$, $Ag_2S$, CuS, $MoS_3$, PbS, $W_2C$, SiC, $B_4C$, TiN, and combinations thereof.

14. The microwave-sensitive thermoplastic composition of claim 4, wherein the additional microwave-receptive additive is selected from the group consisting of polymeric molecules having functionalities including mono- or poly-substitution with hydroxyls, amines, amides, carbonyls, esters, sulfonamides, phosphates, phosphonates, phosphonamides, halides, and combinations thereof.

15. The microwave-sensitive thermoplastic composition of claim 1, wherein the thermoplastic polymer is selected from the group consisting of polyolefins, polyamides, polycarbonates, polyesters, polysulfones, polylactones, polyacetals, acrylonitrile-butadiene-styrene resins (ABS), polyphenyleneoxide (PPO), polyphenylene sulfide (PPS), styrene-acrylonitrile resins (SAN), polyimides, styrene maleic anhydride (SMA), aromatic polyketones, ethylene vinyl alcohol copolymers, and copolymers or mixtures thereof.

16. The microwave-sensitive thermoplastic composition of claim 1, wherein the thermoplastic polymer comprises one or more polymers selected from the group consisting of polyethylene, polypropylene, polystyrene, ethylene copolymers, propylene copolymers, styrene copolymers, and mixtures thereof.

17. A thermoplastic material comprising:
one or more regions comprising the microwave-sensitive thermoplastic composition of claim 1; and
one or more regions comprising a thermoplastic polymer that is substantially transparent to microwaves.

18. The thermoplastic material of claim 17, wherein the thermoplastic material has a core/sheath configuration, wherein the core comprises the microwave-sensitive polymeric region, and wherein the sheath comprises the region comprising a thermoplastic polymer that is substantially transparent to microwaves.

19. The thermoplastic material of claim 17, wherein the thermoplastic material is configured as a layered sheet, wherein one or more layers comprises or is formed by or with a region comprising one or more of the microwave-sensitive thermoplastic compositions.

20. The thermoplastic material of claim 19, wherein outer layers of the layered sheet are transparent to microwave energy.

21. The thermoplastic material of claim 19, wherein the layered sheet is a microlayered sheet.

* * * * *

UNITED STATES PATENT AND TRADEMARK OFFICE
CERTIFICATE OF CORRECTION

PATENT NO. : 8,361,621 B2  
APPLICATION NO. : 12/301934  
DATED : January 29, 2013  
INVENTOR(S) : Cook et al.

Page 1 of 1

It is certified that error appears in the above-identified patent and that said Letters Patent is hereby corrected as shown below:

In the Claims:

Column 23, claim 2, line number 6, the phrase "the ammonium faun" should read

-- the ammonium form --.

Column 23, claim 8, line number 37, the phrase "to for hydrated" should read

-- to form hydrated --.

Signed and Sealed this  
Twenty-fourth Day of December, 2013

Margaret A. Focarino  
*Commissioner for Patents of the United States Patent and Trademark Office*